US007636228B2

(12) United States Patent
Hino et al.

(10) Patent No.: US 7,636,228 B2
(45) Date of Patent: Dec. 22, 2009

(54) ARRESTER

(75) Inventors: Tetsuo Hino, 1-13-23, Meguri, Hirakata-shi, Osaka (JP) 573-1172; Osamu Katoh, 1260-3, Yamamotokita, Osakasayama-shi, Osaka (JP) 589-0035; Tetsuya Sakuda, 4-84, Kumakoji, Kohata, Uji-shi, Kyoto (JP) 611-0002

(73) Assignees: Array Proto Technology Inc., Kyoto (JP); Tetsuo Hino, Kyoto (JP); Osamu Katoh, Kyoto (JP); Tetsuya Sakuda, Kyoto (JP)

( * ) Notice: Subject to any disclaimer, the term of this patent is extended or adjusted under 35 U.S.C. 154(b) by 223 days.

(21) Appl. No.: 11/792,298

(22) PCT Filed: Jul. 7, 2005

(86) PCT No.: PCT/JP2005/012588

§ 371 (c)(1),
(2), (4) Date: Jun. 5, 2007

(87) PCT Pub. No.: WO2006/035537

PCT Pub. Date: Apr. 6, 2006

(65) Prior Publication Data

US 2008/0094772 A1 Apr. 24, 2008

(30) Foreign Application Priority Data

Dec. 6, 2004 (JP) ............................ 2004-352924

(51) Int. Cl.
*H02H 1/00* (2006.01)

(52) U.S. Cl. ....................... 361/130; 361/111; 361/117; 361/120; 361/128; 361/129

(58) Field of Classification Search .................. 361/56, 361/91.1, 111, 117–120, 126–130
See application file for complete search history.

(56) References Cited

U.S. PATENT DOCUMENTS 3,214,634 A * 10/1965 Osmundsen et al. .......... 315/36

(Continued)

FOREIGN PATENT DOCUMENTS

JP 63-24576 A 2/1988

(Continued)

OTHER PUBLICATIONS

Office Action 7 pages.

(Continued)

*Primary Examiner*—Stephen W Jackson
*Assistant Examiner*—Terrence R Willoughby
(74) *Attorney, Agent, or Firm*—Rader, Fishman & Grauer, PLLC

(57) ABSTRACT

The present invention provides an arrester in which energy during discharge is not concentrated in one point and which has good responsiveness to overvoltage. The arrester is provided with an energy absorber 3 that absorbs energy when a lightning strike occurs, and a pair of conductive electrodes 1 and 2. Between the pair of conductive electrodes 1 and 2, two air gaps 9 are formed in series, between the conductive electrode 1 and the energy absorber 3, and between the conductive electrode 2 and the energy absorber 3. The two air gaps 9 include planer gaps.

20 Claims, 54 Drawing Sheets

U.S. PATENT DOCUMENTS

| | | | | | |
|---|---|---|---|---|---|
| 3,780,350 | A * | 12/1973 | Sanger et al. | 361/118 |
| 3,973,172 | A * | 8/1976 | Yost | 361/130 |
| 4,797,778 | A * | 1/1989 | Boy | 361/130 |
| 6,008,977 | A * | 12/1999 | Thatcher | 361/127 |
| 6,519,129 | B1 * | 2/2003 | Ramarge et al. | 361/117 |
| 2002/0075125 | A1 | 6/2002 | Yang | |

FOREIGN PATENT DOCUMENTS

| | | | |
|---|---|---|---|
| JP | 07-118361 | B | 5/1995 |
| JP | 10-247578 | A | 9/1998 |
| JP | 11-354246 | A | 12/1999 |
| JP | 2000-268936 | A | 9/2000 |
| JP | 2001-284009 | A | 10/2001 |
| JP | 2001-291573 | A | 10/2001 |
| JP | 2002-534763 | A | 10/2002 |
| JP | 2003-109719 | A | 4/2003 |
| WO | WO 00/39901 | A1 | 7/2000 |

OTHER PUBLICATIONS

International Search Report.

* cited by examiner

ARRESTER

TECHNICAL FIELD

The present invention relates to an arrester for preventing lightning damage generated by a lightning strike (a lightning surge), to communication equipment and the like.

BACKGROUND ART

Conventionally, in order to prevent lightning damage, in particular, induced lightning damage, an arrester is used in electrical equipment, electronic equipment, communication equipment, control devices, communication lines, and the like using small electric power. FIG. 35 is a schematic view illustrating one example of the configuration of a conventional arrester. In FIG. 35, a conventional arrester has a gap portion 101 forming a gap and a resistor 102 serving as an energy absorber, which are connected in series. The gap portion 101 and the resistor 102 are respectively connected to electrode terminals 103 and 104. The electrode terminal 103 is connected to a lightning damage prevention line, and the electrode terminal 104 is connected to a grounding conductor. The gap portion 101 is a discharge gap where discharge occurs at the time of a high-voltage lightning strike such as induced lightning, and is sealed in a glass case. The resistor 102 is connected for absorbing energy of a lightning strike.

On the other hand, as an arrester capable of promptly absorbing overvoltage generated due to a lightning strike, an arrester also has been developed in which a discharge gap and an energy absorber are integrally formed (see Patent Document 1 etc.). FIG. 36 is a schematic view illustrating one example of the configuration of such a conventional arrester. In FIG. 36, a conventional arrester has molybdenum metals 105 and 106 on whose surfaces electrically insulating oxide films are formed. A discharge gap is formed by the oxide films of the respective molybdenum metals abutting against each other. Furthermore, the molybdenum metals 105 and 106 serve as energy absorbers. The molybdenum metals 105 and 106 are respectively connected to electrode terminals 107 and 108. When a high voltage is applied between the electrode terminals 107 and 108, electricity is discharged between the molybdenum metals 105 and 106, and thus application of overvoltage to electronic equipment or the like is suppressed. In this conventional arrester, even if a voltage between the electrode terminals 107 and 108 is a low voltage, a current flows between the electrode terminals 107 and 108 although the current is extremely small. Thus, there is an advantage in that when an excess voltage generated due to a lightning strike is applied between the electrode terminals 107 and 108, the excess voltage can be promptly absorbed.

[Patent Document 1] JP H07-118361B (pages 1 to 3, FIG. 1 etc.)

DISCLOSURE OF THE INVENTION

Problem to be Solved by the Invention

Recent electronic equipment and the like have rapidly come to operate faster and at a lower voltage. Thus, in such electronic equipment and the like, it is necessary to promptly absorb overvoltage generated due to a lightning strike. Thus, there is a demand for development of an arrester capable of absorbing overvoltage at higher speed than that in the conventional arrester shown in FIG. 35.

On the other hand, in the conventional arrester shown in FIG. 36, when a high voltage is applied between the electrode terminals 107 and 108, the oxide films break at one particular point, and thus electricity is discharged between the molybdenum metals 105 and 106. Accordingly, there is a problem in that energy during the discharge is concentrated in a very small region in which electricity is discharged.

The present invention has been achieved in order to solve the above-described problem, and it is an object thereof to provide an arrester in which energy during discharge is not concentrated in one point and which has good responsiveness to overvoltage.

Means for Solving the Problem

In order to achieve the above-described object, an arrester according to the present invention is an arrester, comprising: at least one energy absorber; and a pair of conductive electrodes, wherein at least two air gaps are formed in series by the energy absorber between the pair of conductive electrodes, and the at least two air gaps include planer gaps.

With this configuration, the widths of the air gaps can be made narrower than those in a case where an arrester has only one air gap. As a result, overvoltage can be responded to at high speed. Furthermore, electricity is discharged at planer air gaps. Thus, one-point concentration of energy during discharge can be avoided.

Furthermore, in the arrester according to the present invention, the number of the energy absorber may be at least two, and an air gap may be formed between one energy absorber and another energy absorber. An air gap may be formed between at least one conductive electrode of the pair of conductive electrodes, and the energy absorber. Furthermore, the at least two energy absorbers forming the air gap, or the conductive electrode and the energy absorber forming the air gap may be fixed to each other with an inorganic adhesive.

With this configuration, the components such as the energy absorber forming air gaps can be fixed to each other with an adhesive. Thus, the widths of the air gaps can be kept uniform. When an inorganic substance is used as the adhesive, a short-circuit can be prevented from being caused due to carbon at the air gaps.

Furthermore, in the arrester according to the present invention, the inorganic adhesive may be elastic after it is hardened.

With this configuration, it is possible to avoid a state in which the bonding is broken by a shock of discharge generated at the air gaps. As a result, the widths of the air gaps can be kept more stably.

Furthermore, in the arrester according to the present invention, an inorganic insulating spacer may be present in the air gaps.

With this configuration, the widths of the air gaps can be kept at a predetermined width, using the spacer. When an inorganic spacer is used as the spacer, a short-circuit can be prevented from being caused due to carbon at the air gaps. When an insulating spacer is used as the spacer, a current can be prevented from flowing at the air gaps via the spacer.

Furthermore, in the arrester according to the present invention, the energy absorber may be made of metal.

With this configuration, a current generated due to a lightning strike flows through the energy absorber, and thus the energy is absorbed.

Furthermore, in the arrester according to the present invention, the metal may be a metal having a high melting point, such as molybdenum and tungsten (wolfram).

With this configuration, even when the temperature at the energy absorber becomes high because of discharge generated by a lightning strike at the air gaps, the energy absorber can resist the high temperature.

Furthermore, in the arrester according to the present invention, an electrically insulating oxide film may be formed on a surface forming the air gap of the energy absorber. With this configuration, generation of corona discharge at the air gaps can be suppressed.

Furthermore, in the arrester according to the present invention, a metal that is different from the metal of the energy absorber may be plated on a surface forming the air gap of the energy absorber.

With this configuration, in a case where the electric conductivity of a metal used for plating is higher than the electric conductivity of the metal used for the energy absorber, it is possible to allow electricity to be easily discharged at the air gaps.

Furthermore, in the arrester according to the present invention, the energy absorber may be sealed.

With this configuration, the energy absorber is sealed so as to cut off the ambient atmosphere. Accordingly, it is possible to prevent the quality of the energy absorber or the discharging characteristics from changing due to ambient outside air having high humidity, and thus it is possible to keep stable discharging characteristics for a long period of time.

Furthermore, in the arrester according to the present invention, the energy absorber is sealed using at least a protective case. Furthermore, the protective case may be formed such that the at least two air gaps can be observed at the time of assembling the protective case.

With this configuration, it is possible to confirm whether or not the air gaps have been formed as appropriate, by applying a predeteremined voltage between the pair of conductive electrodes in the assembling process of the arrester.

Furthermore, the arrester according to the present invention may further comprise a fixing frame for fixing the energy absorber.

With this configuration, for example, work efficiency can be improved compared with that obtained when components such as energy absorbers are directly fixed to a protective case for sealing the energy absorbers.

Furthermore, in the arrester according to the present invention, the fixing frame may be provided so as to have a space in a region of the air gaps.

With this configuration, even when the temperature is locally increased by discharge generated at the air gaps, and metal fine particles of the energy absorber and the like are scattered, a space in which the fine particles can be scattered is provided, and thus it is possible to prevent a state in which the insulation resistance at the air gaps is lowered by the fine particles and the like remaining in or attached to the air gaps.

Furthermore, the arrester according to the present invention may further comprise a protective case for sealing the fixing frame.

With this configuration, the energy absorber is sealed so as to cut off the ambient atmosphere. Accordingly, it is possible to prevent the quality of the energy absorber or the discharging characteristics from changing due to ambient outside air having high humidity, and thus it is possible to keep stable discharging characteristics for a long period of time.

Furthermore, the arrester according to the present invention may further comprise a pair of terminals for connecting the arrester to a circuit board, by being respectively connected to the pair of conductive electrodes.

With this configuration, the arrester can be easily connected to a circuit board. Thus, for example, components such as a semiconductor element and a circuit element arranged on the circuit board can be protected from a high voltage generated due to a lightning strike.

Effects of the Invention

According to the arrester of the present invention, electricity is discharged at planer air gaps. Thus, one-point concentration of energy during discharge can be avoided. Furthermore, electricity is discharged at two or more air gaps formed in series. Thus, the widths of the air gaps can be made narrower, and thus high-speed responsiveness to overvoltage can be realized.

BEST MODE FOR CARRYING OUT THE INVENTION

Embodiment 1

An arrester according to Embodiment 1 of the present invention is described with reference to the drawings.

FIG. 1 is a schematic view schematically illustrating the configuration of an arrester according to this embodiment. In FIG. 1, an arrester according to this embodiment is provided with a pair of conductive electrodes 1 and 2, and an energy absorber 3. Two air gaps 9 are formed in series by the energy absorber 3 between the pair of conductive electrodes 1 and 2.

The energy absorber 3 absorbs energy when a lightning strike occurs. The amount of energy absorbed depends on the resistance value of the energy absorber 3. More specifically, if the resistance value of the energy absorber 3 is small, then the amount of energy absorbed is large, and if the resistance value is large, then the amount of energy absorbed is small. A metal has a predetermined resistance, and thus metals such as aluminum, copper, zinc, iron, titanium, or their alloys can be used as the energy absorber 3. Of metals, metals having a high melting point, such as molybdenum, which has a melting point of approximately 2600° C., tungsten, which has a melting point of approximately 3380° C., and their alloys are preferable as the energy absorber 3. The reason for this is that electricity is discharged at the air gaps 9 when a lightning strike occurs, and the temperature of the energy absorber 3 may become high due to the discharge, depending on factors such as the scale of the lightning strike.

It should be noted that an electrically insulating oxide film may or may not be formed on the surface of the energy absorber 3, in particular, a surface region forming the air gaps 9. In this embodiment, a case is described in which an electrically insulating oxide film is not formed on the surface of the energy absorber 3. Herein, the surface of the energy absorber 3 forming the air gaps 9 refers to a surface on which electricity is actually discharged when electricity is discharged at the air gaps 9. In a case where an oxide film is formed on the surface of the energy absorber 3, it is possible to suppress generation of corona discharge (described later) at the air gaps 9.

Furthermore, a metal that is different from the metal of the energy absorber 3 may or may not be plated or evaporated on the surface of the energy absorber 3, in particular, a surface region forming the air gaps 9. In this embodiment, a case is described in which the different metal is neither plated nor evaporated on the surface of the energy absorber 3. In a case where a different metal, in particular, a metal having high electric conductivity is plated on the surface of the energy absorber 3, it is possible to allow electricity to be easily discharged at the air gaps 9. Furthermore, plating also can prevent the energy absorber 3 from rusting. Herein, examples of the plating may include electroplating, chemical plating, and evaporation plating.

As the conductive electrodes 1 and 2, good conductors such as copper and brass can be used.

The air gaps 9 are gaps at which electricity is discharged when a high voltage generated due to a lightning strike is applied between the conductive electrodes 1 and 2. The air gaps 9 may contain a gaseous substance, or may be a vacuum. The air gaps 9 are formed in series. Herein, the phrase "air gaps are formed in series" refers to a state in which the air gaps are formed so as to be connected in series. Accordingly, a high voltage generated due to a lightning strike is absorbed by a current flowing via both of the two air gaps 9.

The air gaps 9 include planer gaps. A planer gap refers to a gap that is formed between two components, and is formed at least in a microscopic region. It is not necessary for the planer gap to have a flat face. For example, the planer gap may be a gap that is formed by two spheres whose surfaces are close to each other as shown in FIG. 2A. In the case shown in FIG. 2A, at a point where the spheres are close to each other, microscopically, two flat faces are close to each other. Accordingly, herein, a gap formed by two spheres that are close to each other is also referred to as a planer gap. Moreover, also in a case where a sphere and a cylinder are close to each other as shown in FIG. 2B, and in a case where a sphere and a plate are close to each other as shown in FIG. 2C, a planer gap is formed at a point where these objects are close to each other. The planer gaps formed in FIGS. 2B and 2C are circular, and thus these planer gaps are herein referred to as circular gaps.

Moreover, also in a case where a cylinder and a cylinder are close to each other as shown in FIG. 2D, and in a case where a cylinder and a plate are close to each other as shown in FIG. 2E, a planer gap is formed at a point where these objects are close to each other. It should be noted that in the cases shown in FIGS. 2D and 2E, the gap distance between the two cylinders or the gap distance between the cylinder and the plate is preferably uniform. The planer gaps formed in FIGS. 2D and 2E are in the shape of bands, and thus the planer gaps are herein referred to as band-shaped gaps. If the diameter of the spheres is substantially the same as the diameter of the cylinders, then the band-shaped gap has a larger gap area than that of the circular gap.

Moreover, also in a case where two circular plates are close to each other as shown in FIG. 2F, and in a case where two prisms are close to each other as shown in FIG. 2G, a planer gap is formed at a point where these objects are close to each other. It should be noted that in the cases shown in FIGS. 2F and 2G, the gap distance between the two circular plates or the gap distance between the two prisms is preferably uniform. The planer gaps formed in FIGS. 2F and 2G have flat faces, and thus the planer gaps are herein referred to as gaps having flat faces. If the length of the cylinders is substantially the same as the length of the prisms or the diameter of the circular plates, then the gap having flat faces has a larger gap area than that of the band-shaped gap.

It would be appreciated that the shapes of two components forming an air gap are not limited to those in FIGS. 2A to 2G The components may be in any shape, as long as they can form a planer air gap.

It is possible to increase the discharge area, and thus to avoid one-point concentration of energy generated due to discharge in a case where the air gap 9 is a planer gap, compared with a case in which an air gap is a point-like gap, for example, a case in which one object forming an air gap is a needle-like object. As a result, it is possible to suppress generation of corona discharge at the air gap. In a case where corona discharge is generated at the air gaps, a current flows between the conductive electrodes 1 and 2, even if a voltage applied between the conductive electrodes 1 and 2 is lower than a voltage generating discharge in which sparks are generated. In order not to generate such a current, and in order to generate discharge in which sparks are generated without corona discharge, the air gaps are preferably planer gaps at least in a microscopic region. Herein, in order to disperse energy generated due to discharge, a band-shaped gap is more preferable than a circular gap, because a band-shaped gap can disperse more energy. Furthermore, a gap having flat faces is more preferable than a band-shaped gap, because a gap having flat faces can disperse more energy. When more energy is dispersed, the current tolerance during discharge increases.

In a case where a voltage higher than a predetermined withstand voltage is applied between the conductive electrodes 1 and 2, electricity is discharged at the air gap 9 between the conductive electrode 1 and the energy absorber 3, and electricity is also discharged at the air gap 9 between the conductive electrode 2 and the energy absorber 3, so that a current flows between the conductive electrodes 1 and 2. As a result, a high voltage generated due to a lightning strike can be absorbed. Herein, the phrase "high voltage is absorbed" refers to a state in which a high voltage is allowed to escape through the earth ground, or a state in which a high voltage is absorbed by the energy absorber 3, for example.

It should be noted that the widths of the two air gaps 9 may be the same or different.

In the arrester shown in FIG. 1, the air gaps 9 are formed between the conductive electrodes 1 and 2, and the energy absorber 3, but the configuration is not limited to this. For example, as in an arrester shown in FIG. 3, the arrester may be provided with two energy absorbers 3 and 4, and another air gap 9 may be formed between the energy absorber 3 and the energy absorber 4. Furthermore, as in an arrester shown in FIG. 4, the conductive electrodes 1 and 2 may be respectively in contact with energy absorbers 3 and 5, and no air gap may be formed between the conductive electrode 1, 2 and the energy absorber 3, 5. More specifically, an air gap may be formed between at least one conductive electrode of a pair of conductive electrodes, and one energy absorber, or may be formed between one energy absorber and another energy absorber. Furthermore, at least one conductive electrode of a pair of conductive electrodes may be in contact with one energy absorber. In this manner, the arrester according to this embodiment may be in any form, as long as two or more air gaps are formed in series by one or more energy absorbers between a pair of conductive electrodes.

Furthermore, in the arrester according to this embodiment, the energy absorber may or may not be sealed. The phrase "energy absorber is sealed" refers to a state in which the internal atmosphere containing the energy absorber is cut off from an ambient outside air such that the energy absorber is not affected by the ambient outside air. When the energy absorber is sealed, it is possible to prevent the quality of the energy absorber from changing in a case where electricity is not discharged or a case where electricity is discharged at the air gaps. The internal atmosphere is preferably a low-humidity atmosphere, in a case where the energy absorber is sealed therein. Herein, a low-humidity atmosphere refers to a dry atmosphere that is not high as in the rain, and specifically refers to an atmosphere in which the humidity is approximately 80% or lower. The low-humidity atmosphere is obtained by filling the internal atmosphere with inert gas, or vacuumizing the internal atmosphere. As the inert gas, for example, rare gas such as helium gas, neon gas, and argon gas may be used, or nitrogen gas or the like may be used. Furthermore, the low-humidity atmosphere may be obtained, by simply performing sealing in a low-humidity atmosphere.

Hereinafter, examples of the arrester according to this embodiment are specifically described. In the examples below, only a case is described in which the energy absorber is sealed in a low-humidity atmosphere. However, as described above, the energy absorber may not be sealed.

EXAMPLE 1

FIG. 5 is an exploded perspective view illustrating the configuration of an arrester according to this example. A method for forming the arrester according to this example is described with reference to FIG. 5. First, a protective case 12 is bonded to a conductive electrode 11. For this bonding, for example, an epoxy-based adhesive may be used, or an inorganic adhesive containing a modified polymer plasticizer or the like may be used. In a case where a carbon-containing adhesive such as an epoxy-based adhesive is used, the adhesive is regulated so as not to bulge out into the internal portion of the protective case 12. The reason for this is that carbon is not preferable in the vicinity of the air gaps, as described later.

As the protective case 12, for example, a case made of heat-resistant glass or ceramics can be used. Herein, as the material of the protective case 12, a material other than those containing carbon (resin etc.) is preferable. In a case where the protective case 12 contains carbon, the carbon may drift around an energy absorber 10. In such an environment, if discharge is generated due to a lightning strike at the air gaps, then carbon may be attached to the surface of the energy absorber 10. In this case, if a short-circuit is caused due to the attached carbon at the air gaps, then discharge gaps are damaged, and thus the apparatus cannot serve as an arrester.

Internal grooves 12*a* and 12*b* are formed inside the protective case 12, and two spacers 13 and 14 are respectively inserted into the left and right ends of the internal grooves 12*a* and 12*b*. The two spacers 13 and 14 are bonded to the conductive electrode 11 with an adhesive. Next, the cylindrical energy absorber 10 is inserted into the internal grooves 12*a* and 12*b*. The spacers 13 and 14, and the energy absorber 10 are also bonded to each other with an adhesive. The energy absorber 10 and the protective case 12 are also bonded to each other in order to prevent dislocation of the energy absorber 10. Furthermore, spacers 15 and 16 are respectively inserted into the left and right ends of the internal grooves 12*a* and 12*b*, and are bonded to the energy absorber 10 with an adhesive. Lastly, the protective case 12 and a conductive electrode 17 are bonded to each other, and the conductive electrode 17, and the spacers 15 and 16 are bonded to each other, so that the energy absorber 10 is sealed, and the arrester is thus obtained. The thickness of the protective case 12 is the sum of the thickness of the two spacers and the diameter of the energy absorber 10. The spacers 13 to 16 are used in order that the widths of the air gaps formed between the energy absorber 10, and the conductive electrodes 11 and 17 be kept uniform. The spacers 13 to 16 are inorganic insulating spacers, and made of a material such as glass, ceramics, or mica, which is a natural mineral sheet having high insulating properties. The spacers 13 to 16 are inorganic spacers, for the purpose of preventing a short-circuit from being caused due to carbon at the air gaps. Furthermore, the spacers 13 to 16 have insulating properties, for the purpose of preventing a current from flowing via the spacers 13 to 16 at the air gaps. It should be noted that electricity is hardly discharged at a portion including the spacers 13 to 16 in the air gaps. Thus, it is preferable that the proportion of the spacers 13 to 16 to the air gaps is small.

Herein, the adhesive used for bonding the spacers 13 to 16 or the energy absorber 10 is an inorganic adhesive. The reason for this is that an adhesive containing no carbon is preferable in order to prevent a short-circuit from being caused due to carbon at the air gaps, as described above. Furthermore, the inorganic adhesive is preferably elastic even after it is hardened. The reason for this is that bonding can be prevented from being broken, by absorbing a shock at generation of discharge at the air gaps, and thus the widths of the air gaps can be stably kept. As this adhesive, for example, an adhesive containing approximately 20% of a special silicone modified polymer, approximately 10% of a plasticizer, and approximately 70% of an inorganic substance, or an adhesive containing approximately 70% of a special silicone modified polymer and approximately 30% of an inorganic substance may be used.

FIG. 6 is a schematic view schematically showing the configuration of the assembled arrester in this example, viewed in the longitudinal direction of the energy absorber 10. In FIG. 6, the protective case 12 is transparent, for the sake of convenience. In FIG. 6, two air gaps are formed by the spacers 13 and 15, between the energy absorber 10 and the conductive electrode 11, and between the energy absorber 10 and the conductive electrode 17. The widths of the air gaps are 0.01 to 0.08 mm, for example. The diameter of the energy absorber 10 is 2 mm, and the length thereof is 7 mm, for example. The withstand voltage can be freely set by changing the widths of the air gaps or the diameter of the energy absorber 10. For example, the withstand voltage can be changed in a range from several tens of volts to several hundreds of volts.

FIG. 7 is a schematic view schematically illustrating the configuration of the assembled arrester in this example, viewed from above. In FIG. 7, the protective case 12 is transparent, for the sake of convenience. In FIG. 7, since the spacers 13 and 14 having an equal thicknesses are present between the energy absorber 10 and the conductive electrode 11, an air gap as a uniform spacing is formed. An air gap is also formed in a similar manner between the energy absorber 10 and the conductive electrode 17. When a high voltage is applied between the conductive electrode 11 and the conductive electrode 17, electricity is discharged at the air gaps, and thus the high voltage is absorbed. The electricity is discharged at a region excluding the spacers 13 to 16, in the air gaps formed between the energy absorber 10, and the conductive electrodes 11 and 17.

In this example, a case is described in which the energy absorber 10, and the spacers 13 to 16 are bonded to each other and in which the spacers 13 to 16, and the conductive electrodes 11 and 17 are bonded to each other. However, there is no limitation on a bonding method, as long as the energy absorber 10 and the conductive electrodes 11 and 17 are fixed to each other such that the widths of the air gaps formed between the energy absorber 10, and the conductive electrodes 11 and 17 are kept uniform. For example, the energy absorber 10 and the conductive electrodes 11 and 17 may be integrally bonded to each other, by injecting an inorganic adhesive into the internal grooves 12*a* and 12*b*. Alternatively, the energy absorber 10 and the conductive electrodes 11 and 17 may be fixed to each other such that the widths of the air gaps are kept uniform, by bonding the energy absorber 10 to the protective case 12 and bonding the conductive electrodes 11 and 17 to the protective case 12.

EXAMPLE 2

FIG. 8 is an exploded perspective view illustrating the configuration of an arrester according to this example. A method for forming the arrester according to this example is described with reference to FIG. 8. In this example, two separate protective cases, that is, a protective case 24 and a protective case 25 are provided. A conductive electrode 22 is a circular component whose side face has a concentric and smaller circular protrusion. The circular protrusion is engaged with arcs inside the protective cases 24 and 25. Thus, first, one semi-arc side face of the protective case 25 and an annular side face of the conductive electrode 22 are bonded to each other.

Next, cylindrical energy absorbers 20 and 21 are placed so as to extend between grooves 25*a* and 25*b* that are provided at both ends of the protective case 25. It should be noted that as shown in FIG. 8, there are spacers 26 to 31 around the energy absorber 20 and the energy absorber 21. Then, a conductive electrode 23 having a similar shape as that of the conductive electrode 22 is bonded to the protective case 25 so as to be opposed to the conductive electrode 22. Lastly, the protective case 24 is placed from above, the protective case 24 and the protective case 25 are bonded to each other, and the protective case 24 and each of the conductive electrodes 22 and 23 are bonded to each other, so that the arrester is completed.

FIG. 9 is a top view illustrating a state in which the energy absorbers 20 and 21, the conductive electrodes 22 and 23, and the protective case 25 have been assembled, that is, a state before the protective case 24 is placed. Also in this example, the spacers 26 to 31 form three air gaps. It should be noted that in this example, the protective case is formed such that two or more air gaps formed between the conductive electrodes 22 and 23 can be observed when the protective cases 24 and 25 are being assembled. Accordingly, when a high voltage similar to that generated at the time of a lightning strike is applied between the conductive electrodes 22 and 23 in the assembling process shown in FIG. 9, a discharge state can be visually confirmed. As a result of this confirmation, if electricity is discharged throughout the entire face of the air gaps, then the energy absorbers 20 and 21, the protective case 25, the spacers 26 to 31, and the conductive electrodes 22 and 23 are bonded to each other with an inorganic adhesive such that the widths of the air gaps are continuously kept uniform, and the assembling is continued. Herein, in a state where components such as the energy absorbers 20 and 21 are bonded after the widths of the air gaps are confirmed to be uniform, the discharging characteristics may be measured by applying an impulse voltage, and then the discharging characteristics may be further confirmed by a visual inspection. Then, only in a case where appropriate discharging characteristics can be confirmed by measurement and visual inspection, the energy absorbers 20 and 21 may be sealed by bonding the protective case 24. In a case where electricity is discharged only partially at the air gaps because the widths of the air gaps are not uniform, spacers and the like may be adjusted such that the widths of the air gaps are uniform, or that arrester may not be assembled. In this manner, it is possible to visually confirm in the assembling process whether or not electricity is discharged as appropriate, when the protective case is formed such that the two or more air gaps can be observed in the assembling process.

FIG. 10 is a schematic view schematically illustrating the configuration of the assembled arrester in this example, viewed in the longitudinal direction of the energy absorbers 20 and 21. In FIG. 10, the protective cases 24 and 25 are transparent, for the sake of convenience. In FIG. 10, three air gaps are formed by the spacers 26, 28, and 30, respectively between the energy absorber 20 and the conductive electrode 22, between the energy absorber 20 and the energy absorber 21, and between the energy absorber 21 and the conductive electrode 23.

Also in this example, the energy absorbers 20 and 21 and the conductive electrodes 22 and 23 forming the air gaps may be fixed to each other with an inorganic adhesive. When the energy absorbers 20 and 21 and the conductive electrodes 22 and 23 are fixed to each other with an adhesive, the widths of the air gaps are kept uniform. Herein, any bonding method may be applied for fixing the energy absorbers 20 and 21 and the conductive electrodes 22 and 23 to each other, as in the description in Example 1.

In this example, a case is described in which three air gaps are formed by the energy absorbers 20 and 21. However, four or more air gaps may be formed by increasing the number of the energy absorbers. For example, as shown in FIG. 11, four air gaps may be formed by three cylindrical energy absorbers 20, 21, and 34 between the conductive electrodes 22 and 23.

In this example, a case is described in which an air gap is formed, between the two cylindrical energy absorbers 20 and 21, or between the cylindrical energy absorber 20, 21 and the conductive electrode 22, 23 having flat faces. However, an air gap may be formed between components having flat faces. For example, as shown in FIG. 12, four air gaps may be formed by three prismatic energy absorbers 35 to 37 between the conductive electrodes 22 and 23.

In this example, a case is described in which air gaps are formed by the spacers 26 to 31 that are inserted at both end portions of the energy absorbers 20 and 21. However, as shown in FIG. 13, air gaps may be formed by spacers 26, 28, and 30 that are inserted in the vicinity of the centers of the energy absorbers 20 and 21. In a state where the spacers 26, 28, and 30 are inserted in this manner, both ends of the energy absorbers 20 and 21 may be fixed to the protective case 25 with an inorganic adhesive, and the spacers 26, 28, and 30 may be removed after the fixing. In a case where the spacers are removed in this manner, the spacers may not be inorganic insulating spacers. More specifically, the spacers may be made of an organic material or a good conductor, for example.

Herein, in a case where the spacers are removed after the components such as the energy absorbers have been fixed with an adhesive such that the widths of the air gaps can be kept uniform, if the adhesive is present also at the air gaps, then it is preferable that the proportion of the adhesive to the air gaps is small. The reason for this is that electricity is hardly discharged at a portion including the adhesive at the air gaps. Furthermore, in a case where the adhesive is present also at the air gaps, then it is necessary for the adhesive to be an insulating substance. This is for the purpose of preventing a current from flowing via the adhesive.

EXAMPLE 3

FIG. 14 is an exploded perspective view illustrating the configuration of an arrester according to this example. A method for forming the arrester according to this example is described with reference to FIG. 14. Also in this example, two separate protective cases, that is, a protective case 45 and a protective case 46 are provided as in Example 2. It should be noted that two energy absorbers 40 and 42 among three energy absorbers 40 to 42 are respectively in contact with conductive electrodes 43 and 44 after assembling. Accordingly, air gaps are formed, between the energy absorbers 40 and 41, and between the energy absorbers 41 and 42. A method for assembling the arrester according to this example is a similar to that in Example 2, and therefore a description thereof is omitted.

FIG. 15 is a schematic view of the arrester according to this example, viewed in the longitudinal direction of the energy absorbers 40 to 42. In FIG. 15, the protective cases 45 and 46 are transparent, for the sake of convenience. As shown in FIG. 15, the energy absorbers 40 and 42 are respectively in contact with the conductive electrodes 43 and 44, and thus no air gap is formed between the energy absorber 40, 42 and the conductive electrode 43, 44. On the other hand, air gaps are formed by spacers 47 to 50, between the energy absorbers 40 and 41, and between the energy absorbers 41 and 42.

It should be noted that in a case where the conductive electrodes 43 and 44 are in contact with the energy absorbers 40 and 42 as in this example, the conductive electrodes 43 and 44 may not be in the shape as shown in FIG. 14. For example, the conductive electrodes 43 and 44 may be lead wires that are connected to the energy absorbers 40 and 42.

EXAMPLE 4

FIG. 16 is an exploded perspective view illustrating the configuration of an arrester according to this example. A method for forming the arrester according to this example is described with reference to FIG. 16. Also in this example, two separate protective cases, that is, a protective case 64 and a protective case 65 are provided as in Example 2. It should be noted that two energy absorbers 60 and 61 are spheres. Furthermore, spacers 66 to 68 are circular plates.

The arrester according to this example is formed as in Example 2. First, a conductive electrode 62 is bonded to the protective case 65, and the spacers 66 to 68 and the energy absorbers 60 and 61 are alternated in a groove inside the protective case 65. Then, a conductive electrode 63 is bonded to an open end, of the ends of the groove inside the protective case 65. An adhesive used for this bonding is also an inorganic adhesive. Furthermore, the adhesive is preferably elastic. FIG. 17 is a top view schematically illustrating the configuration of the arrester in the assembling process. In FIG. 17, three air gaps are formed by the spacers 66 to 68 between the conductive electrodes 62 and 63. In the state shown in FIG. 17, the energy absorbers 60 and 61 are bonded to the protective case 65. Then, after the energy absorbers 60 and 61 have been immovably fixed with an adhesive, the spacers 66 to 68 are pulled out. FIG. 18 is a top view illustrating the configuration in which the spacers 66 to 68 have been pulled out. Then, the protective case 64 on the upper side is placed, the protective case 64 and each of the conductive electrodes 62 and 63 are bonded to each other, and the protective case 64 and the protective case 65 are bonded to each other. The arrester is completed in this manner.

In this example, a case is described in which the spacers 66 to 68 are pulled out after the energy absorbers 60 and 61 have been fixed to the protective case 65 with an adhesive. However, the spacers 66 to 68 may not be pulled out. Herein, in a case where the spacers 66 to 68 are not pulled out, it is necessary to use the spacers 66 to 68 having cavities at regions where discharge occurs so that discharge occurs between the energy absorbers 60 and 61, or between the energy absorber 60, 61 and the conductive electrode 62, 63. For example, the spacers may be formed to be toric, that is, in the shape of doughnuts so that discharge occurs at holes of the toric spacers between the energy absorbers 60 and 61 or the like.

In the foregoing examples, a case is described in which sealing is performed using conductive electrodes and a protective case. However, the energy absorber may be sealed only using a protective case. More specifically, it is sufficient that the energy absorber is sealed at least using a protective case. For example, sealing may be performed using a protective case, and lead wires that are connected to conductive electrodes may extend to the outside of the protective case via holes provided on the protective case or connecting portions of the protective case. Herein, it is necessary to fill a gap between the lead wires and the holes or the like, for example, with an adhesive.

In the foregoing examples, a case is described in which two or more energy absorbers forming air gaps, or conductive electrodes and a energy absorber forming air gaps are bonded to each other with an inorganic adhesive, and thus the air gaps are kept uniform. However, other methods may be used for keeping air gaps uniform. For example, in the foregoing examples, air gaps may be kept uniform, by bonding a pair of conductive electrodes to a protective case in a state where an energy absorber and spacers are held by the conductive electrodes. Alternatively, an end of an energy absorber may be fixed to a protective case or the like with a predetermined fixing tool. As the fixing tool, an inorganic insulating product is preferable. For example, an energy absorber may be fixed to a protective case, with a screw made of an inorganic insulating material.

In the foregoing examples, the number of air gaps, the size of an energy absorber, an the like may be changed depending on the application of the arrester. For example, in a case where the arrester is used for a signal line for transmitting an information signal, an energy absorber may be smaller than that in a case where the arrester is used for a power supply line. For example, the diameter of the energy absorber may be 1 mm, and the length thereof may be 4 mm. In the case of an information signal, the voltage level is low, and it is necessary to correspond up to a high-frequency signal band. Accordingly, it is necessary to reduce the electrostatic capacitance of the arrester, and to lower the withstand voltage. Furthermore, in a case where the arrester is used for a signal line for transmitting an information signal, overvoltage can be absorbed at high speed, by increasing the number of air gaps, for example. On the other hand, in a case where the arrester is used for a power supply line, an energy absorber may be longer and thicker, in order to increase the current tolerance. For example, the diameter of the energy absorber may be 4 mm, and the length thereof may be 10 mm.

In foregoing examples, a protective case is described that is configured such that two or more air gaps can be observed during assembling. However, this is merely an example, and there is no limitation on the configuration of the protective case, as long as two or more air gaps can be observed therein during assembling.

Lastly, the application of the arrester in this embodiment is briefly described. FIG. 19A is a diagram illustrating a case in which arresters are used for power supply lines. As shown in FIG. 19A, two conductive electrodes of an arrester may be respectively connected to lines (lightning damage prevention lines) L1 and L2 in which lightning damage is to be prevented, or one end of a conductive electrode of an arrester may be connected to the lightning damage prevention line L1, L2 and one end of the other conductive electrode may be connected to a grounding conductor. Thus, a high voltage on a power supply line generated due to a lightning strike can be efficiently absorbed by the arrester. Herein, FIG. 19A shows three arresters, but only any one of them may be used, two or more arresters may be used in any combination. In a case where an arrester is used for a power supply line, the arrester is preferably provided between the power supply line and the earth ground.

FIG. 19B is a diagram illustrating a case in which arresters are used for signal lines to electronic equipment or the like. As shown in FIG. 19B, two conductive electrodes of an arrester may be respectively connected to a lightning damage prevention line L3 and a lightning damage prevention line L4, or an arrester may be provided between the lightning damage prevention line L3, L4 and a grounding conductor, as in FIG. 19A. When the arresters are provided in this manner, a high voltage generated due to a lightning strike can be efficiently absorbed, and thus damage, caused by a high voltage, of the electronic equipment or the like can be avoided. Herein, FIG. 19B shows three arresters, but only any one of them may be used, two or more arresters may be used in any combination. In a case where an arrester is used for signal lines to electronic equipment or the like, the arrester is preferably provided between the signal lines (L3 and L4 in FIG. 19B).

Furthermore, as shown in FIG. 20, an arrester may be constituted by a square protective case 70, and the arrester may be attached to a printed circuit board or the like by welding or brazing electrode wires 73 and 74 respectively to conductive electrodes 71 and 72. In this manner, the shape of the protective case is not limited to a cylindrical shape, and the protective case may be in any shape such as rectangular solid or sphere. Furthermore, when the arrester is attached to a printed circuit board or the like, for example, an electronic circuit formed on the printed circuit board or the like can be protected from lightning damage.

As described above, in the arrester according to this embodiment, two or more air gaps are formed in series by an energy absorber between a pair of conductive electrodes. Thus, compared with a conventional arrester having a single air gap, the widths of the air gaps are narrower, and faster response characteristics can be realized. For example, in a case where an arrester is constituted by four cylindrical energy absorbers having a diameter of 2 mm and a length of 7 mm, and a test impulse signal having a voltage of 1 kV and rising in 1 nanosecond is applied, the response time of the arrester is as very fast as 2 to 4 nanoseconds. Herein, the response time refers to time from when application of the test impulse signal is started to when the voltage between conductive electrodes of the arrester reaches the maximum value. Furthermore, when the air gaps include planer gaps, one-point concentration of energy can be avoided during discharge at the air gaps, and the energy tolerance can be increased.

Furthermore, when the energy absorber is sealed so as to cut off the ambient atmosphere, it is possible to prevent the quality of the energy absorber or the discharging characteristics from changing due to ambient outside air having high humidity, and thus it is possible to keep stable discharging characteristics for a long period of time.

Furthermore, when the widths of the air gaps are set using spacers, it is possible to easily set the widths of the air gaps serving as an important factor for determining the withstand voltage. After the widths of the air gaps have been set, the spacers may be removed or may be left at the air gaps, as described in the foregoing examples.

In this embodiment, a case is described in which the number of energy absorbers is one to three, but there is no limitation on the number as long as it is one or more. Herein, it is necessary for two or more air gaps to be formed in series between a pair of conductive electrodes.

The present invention is not limited to the embodiments set forth herein. Various modifications are possible within the scope of the present invention.

Embodiment 2

An arrester according to Embodiment 2 of the present invention is described with reference to the drawings. The arrester according to this embodiment is provided with a fixing frame for fixing energy absorbers such that air gaps are kept uniform. In this embodiment, components referred as in Embodiment 1 are similar to those described in Embodiment 1, and therefore a description thereof may not be repeated.

FIGS. 21A to 21C show a fixing frame 201 according to this embodiment. FIG. 21A is a side view of the fixing frame 201. The fixing frame 201 has side faces 201*a* that are opposed to each other, upper faces 201*b* that are provided perpendicular to the side faces 201*a*, and a bottom face 201*c*. FIG. 21B is a top view of the fixing frame 201. As shown in FIG. 21B, the bottom face 201*c* of the fixing frame 201 is provided with a window 201*d*. The upper faces 201*b* that are opposed to the window 201*d* also have an opening therebetween. FIG. 21C is a side view of the fixing frame 201, viewed from the front of the side face 201*a*. The side face 201*a* is provided with an injection hole 201*e* through which an adhesive for fixing components such as energy absorbers and conductive electrodes is to be injected.

Next, a method for fixing energy absorbers and conductive electrodes to the fixing frame 201 is described. First, cylindrical energy absorbers 202 and 203 and cylindrical conductive electrodes 204 and 205 are inserted into the fixing frame 201 such that the end portions of the energy absorbers 202 and 203 and the conductive electrodes 204 and 205 are positioned between the opposing side faces 201*a* of the fixing frame 201. FIG. 22A is a side view of the fixing frame 201 into which the energy absorbers 202 and 203, and the conductive electrodes 204 and 205 have been inserted. FIG. 22B is a top view of the fixing frame 201 in this state. FIG. 22C is a side view of the fixing frame 201 in this state, viewed from the front of the side face 201*a*. A gap between the conductive electrode 204 and the energy absorber 202 is made uniform by inserting a spacer therebetween. Furthermore, a gap between the energy absorbers 202 and 203 is made uniform by inserting a spacer therebetween. Furthermore, a gap between the energy absorber 203 and the conductive electrode 205 is made uniform by inserting a spacer therebetween. In this state, an inorganic adhesive is injected through each of the injection holes 201*e* of the opposing side faces 201*a*, and thus the energy absorbers 202 and 203, and the conductive electrodes 204 and 205 are fixed at both end portions. As a result, the widths of the air gaps formed between the energy absorbers 202 and 203 and the conductive electrodes 204 and 205 are kept uniform. It should be noted that this inorganic adhesive may be elastic after it is hardened, as described in Embodiment 1. Furthermore, in this case, the fixing frame 201, the energy absorbers 202 and 203, and the conductive electrodes 204 and 205 may be fixed to each other, or the energy absorbers 202 and 203, and the conductive electrodes 204 and 205 may be fixed to each other, with an inorganic adhesive. Also in the latter case, components such as the energy absorbers 202 and 203 are immovably fixed to the fixing frame 201 with an inorganic adhesive. Then, after the inorganic adhesive is hardened, the spacers may be removed or may be left at the air gaps, as described in Embodiment 1. In a case where the spacers are removed, it is possible to remove the spacers from the opening between the upper faces 201*b*, the window 201*d* provided on the bottom face 201*c*, or the like.

The fixing frame 201 may be made of an inorganic material such as glass or ceramics, or made of a resin such as PVC (polyvinyl chloride). The fixing frame 201 preferably has high insulating properties. Furthermore, it is preferable to use the fixing frame 201 in which the widths of the air gaps are not changed by a change in environment such as temperature or humidity.

Next, the fixing frame 201 to which the energy absorbers 202 and 203, and the conductive electrodes 204 and 205 have been fixed is placed in a protective case 206, and sealed. FIGS. 23A and 23B show the sealed fixing frame 201. FIG. 23A is a schematic view, seen through a side face of the protective case 206. FIG. 23B is a schematic view, seen through upper faces of the protective case 206. The fixing frame 201 is fixed to the protective case 206 with an adhesive that is stable against a change in environment such as temperature or humidity. As the adhesive, for example, STYCAST2651MM (manufactured by Emerson & Cuming Company), which is a two-liquid heat-resistant adhesive, may be used. There is no limitation on the type of the adhesive for bonding the fixing frame 201 to the protective case 206, and it may be an inorganic adhesive or a non-inorganic adhesive such as an epoxy-based adhesive, for example. The reason for this is that the adhesive is not used in the vicinity of the air gaps. However, the adhesive is preferably a heat-resistant adhesive, because the temperature may be high when electricity is discharged or when the arrester is soldered to a circuit board or the like, for example. The above-mentioned STYCAST2651MM (manufactured by Emerson & Cuming Company) can resist heat up to 175° C.

As the protective case 206, for example, a product made of a material containing no carbon, such as heat-resistant glass or ceramics, or a resin case may be used, as in Embodiment 1. In this embodiment, the fixing frame 201 for fixing the energy absorbers 202 and 203, and the conductive electrodes 204 and 205 is present, and the protective case 206 is not present in the vicinity of the air gaps, and thus the air gaps are hardly affected even if the protective case 206 contains carbon.

Furthermore, before the fixing frame 201 is placed in the protective case 206, it may be confirmed whether or not discharging characteristics are appropriate, by applying a high voltage between the conductive electrodes 204 and 205. Then, only in a case where the discharging characteristics are appropriate, the fixing frame 201 may be placed in the protective case 206 and sealed.

Furthermore, as shown in FIGS. 23A and 23B, a pair of conductive terminals 207 and 208 are respectively connected to the pair of conductive electrodes 204 and 205. The terminals 207 and 208 may be made of any material, as long as it is conductive. The terminals 207 and 208 are embedded in the conductive electrodes 204 and 205, and secured thereto by brazing, soldering, or welding, for example. There is no limitation on a method for connecting the conductive electrodes 204 and 205, and the terminals 207 and 208. For example, the conductive electrodes and the terminals may be integrally formed. It should be noted that gaps between holes of the protective case 206 through which the terminals 207 and 208 pass, and the terminals 207 and 208, are filled with an adhesive or the like, and the internal portion of the protective case 206 is sealed.

FIG. 24 is a schematic view illustrating the external appearance of a thus formed arrester 200. As shown in FIG. 25, for example, the arrester 200 is used in a state where the terminals 207 and 208 are respectively soldered to circuit wirings 210 and 211 on a circuit board 209.

As described above, the arrester 200 according to this embodiment is further provided with the fixing frame 201 for fixing the energy absorbers 202 and 203. Thus, the components such as the energy absorbers 202 and 203 can be fixed to the fixing frame 201, and the fixing frame 201 can be fixed to the protective case 206. Accordingly, work efficiency can be improved compared with that obtained when components such as energy absorbers are directly fixed to a protective case for sealing the energy absorbers. Furthermore, the fixing frame 201 is provided so as to have spaces in regions of the air gaps. The regions of the air gaps refer to an air gap regions on the side of the upper faces 201*b*, and that on the side of the bottom face 201*c*, in FIGS. 22A to 22C and FIGS. 23A and 23B. More specifically, spaces are formed, as the window 201*d* provided in the fixing frame 201, and the opening between the upper faces 201*b*. As a result, even when the temperature at the air gaps is locally increased by discharge generated due to induced lightning, and thus the surface of the energy absorbers 202 and 203 or the surface of the conductive electrodes 204 and 205 is evaporated, so that metal fine particles and the like are scattered, spaces in which the fine particles can be scattered are provided, and thus it is possible to prevent a state in which the insulation resistance at the air gaps is lowered by the fine particles and the like remaining in or attached to the air gaps.

Furthermore, when the terminals 207 and 208 for connecting the arrester 200 to a circuit board are connected to the conductive electrodes 204 and 205, it is possible to easily connect the arrester 200 to the circuit board. As a result, the arrester 200 is attached to a circuit board of, for example, electrical equipment or electronic equipment, and thus components such as a semiconductor element and an IC element that are provided at power input portions and output portions, and signal input portions and output portions, can be protected as appropriate from an excessive surge voltage generated due to induced lightning.

Furthermore, since spaces are formed in the regions of the air gaps, the fixing frame 201 is not present in the vicinity of the discharge regions of the air gaps. Thus, the fixing frame 201 can be made of a resin, so that the limitation on the shape of the fixing frame 201 can be further reduced.

It should be noted that the terminals 207 and 208 of the arrester 200 may be bent so as to widen the spacing between the terminals 207 and 208, as shown in FIG. 26. When the spacing between the terminals 207 and 208 is widened in this manner, it is possible to reduce the possibility that electricity is discharged between the terminals in a case where a high voltage is applied between the terminals.

There is no limitation on the direction in which the terminals are extended out. For example, as shown in FIGS. 27A and 27B, the terminal 207 and the terminal 208 may be attached in different directions. With this configuration, the spacing between the terminals 207 and 208 can be widened, and thus it is possible to reduce the possibility that electricity is discharged between the terminals in a case where a high voltage is applied between the terminals.

Furthermore, the terminals 207 and 208 may not be wires, and may be prisms that are thicker than wires, as shown in FIGS. 28A to 28C. FIG. 28A is a schematic view, seen through a side face of the protective case 206. FIG. 28B is a schematic view, seen through upper faces of the protective case 206. FIG. 28C is a side view of the arrester 200 on the side of the terminal 208. Herein, in order to connect the terminals 207 and 208 to the conductive electrodes 204 and 205, holes that are larger than the injection holes 201*e* shown in FIG. 21C are formed in the regions corresponding to the conductive electrodes 204 and 205, on the side faces 201*a* of the fixing frame 201. The conductive electrodes 204 and 205 and the terminals 207 and 208 are connected to each other, for example, by brazing, soldering, or welding as in the description above. For example, as shown in FIG. 29, the arrester 200 is connected by respectively soldering the terminals 207 and 208 to circuit wirings 212 and 213 on the circuit board. Herein, the arrester 200 may be fixed to the circuit board using an auxiliary fixing tool or the like such that the arrester 200 does not easily fall off from the circuit board due to vibrations of the circuit board or the arrester 200. It would be appreciated that the terminals 207 and 208 may be provided on the same side, as in the arrester 200 shown in FIG. 24. Furthermore, it would be appreciated that the shape of the terminals 207 and 208 may be in a shape other than prism, such as cylinder.

The space provided in the regions of the air gaps in the fixing frame 201 may be formed by a component other than the window 201*d*. For example, as shown in FIGS. 30A to 30C, the space may be formed by rails 214 that protrude toward the inner portion of the fixing frame 201, on the bottom face 201*c* of the fixing frame 201. FIG. 30A is a side view of the fixing frame 201. FIG. 30B is a top view of the fixing frame 201. As shown in FIGS. 30A to 30C, the pair of rails 214 are provided parallel to each other. As shown in FIG. 30C, the conductive electrodes 204 and 205, and the energy absorbers 202 and 203 are placed on the rails 214. For example, in a case where the diameter of the energy absorbers 202 and 203 is 2 mm and the length thereof is 7 mm, the height of the rails 214 may be approximately 0.3 to 1.0 mm. Herein, as described above, spacers are inserted into positions at which air gaps are to be formed, and then an inorganic adhesive is injected through the injection holes 201*e* provided on the side faces 201*a* of the fixing frame 201, so that the energy absorbers 202 and 203, and the conductive electrodes 204 and 205 are fixed such that the widths of the air gaps are kept uniform. When the energy absorbers 202 and 203, and the conductive electrodes 204 and 205 are placed on the rails 214, a space is formed in the air gaps on the side of the bottom face 201*c*. As a result, even when the temperature at the air gaps is locally increased by discharge generated due to induced lightning, and thus metal fine particles and the like on the surface of the energy absorbers 202 and 203 or the conductive electrodes 204 and 205 are scattered, spaces in which the fine particles can be scattered are provided, and thus it is possible to prevent a state in which the insulation resistance at the air gaps is lowered by the fine particles and the like remaining in or attached to the air gaps. In FIGS. 30A to 30C, a case is described in which the window 201*d* is not provided, but the fixing frame 201 may have both of the window 201*d* and the rails 214.

The configuration of the arrester is not limited to those described above. For example, as in the arrester shown in FIGS. 31A and 31B, an arrester may be provided with four energy absorbers 214 to 217. FIG. 31A is a schematic view, seen through a side face of the protective case 206. FIG. 31B is a side view on the side of the terminal 208, seen through the fixing frame 201 and the protective case 206. In the arrester shown in FIGS. 31A and 31B, the four energy absorbers 214 to 217 are fixed to the fixing frame 201. Furthermore, air gaps are respectively formed between two conductive electrodes 218 and 219 and the energy absorbers 214 and 217, via the window 201*d* provided on the bottom face 201*c* of the fixing frame 201. Each of the conductive electrodes 218 and 219 is secured to the fixing frame 201 with an inorganic adhesive. As a result, the widths of the air gaps formed by the conductive electrodes 218 and 219, and the energy absorbers 214 and 217 can be kept uniform. This arrester can have five air gaps without increasing the width thereof. The terminals 208 and 207 are respectively connected to the conductive electrodes 218 and 219 (the terminal 207 is not shown in FIG. 31A). In FIGS. 31A and 31B, the terminals 207 and 208 are provided on the same side, but the terminals 207 and 208 may be provided on the opposite sides as shown in FIGS. 27A and 27B, or prismatic terminals 207 and 208 may be provided as shown in FIGS. 28A to 28C.

Furthermore, as shown in FIG. 32, the fixing frame 201 may be provided with multiple slit-like windows 201*d*. Spaces are formed in the regions of the air gaps by the multiple windows 201*d*, as in the description above. Furthermore, the spacers inserted into the air gaps can be removed via the slit-like windows 201*d*. Furthermore, as shown in FIG. 32, multiple injection holes 220 may be provided on the upper faces 201*b* of the fixing frame 201. The multiple injection holes 220 are preferably positioned, between an energy absorber and an energy absorber, or between an energy absorber and a conductive electrode, in a state where the energy absorber and the like are placed in the fixing frame 201. It should be noted that multiple injection holes may be provided in a similar manner also on the bottom face 201*c* of the fixing frame 201.

Furthermore, as shown in FIG. 33, end portions of the upper faces 201*b* of the fixing frame 201 may be curved toward the bottom face 201*c*. In a case where the fixing frame 201 is made of an elastic resin or the like, energy absorbers and conductive electrodes can be held between the end portions of the upper faces 201*b* and the bottom face 201*c*, and thus a process of fixing the energy absorbers and the like to the fixing frame 201 can be easily performed.

Furthermore, the injection hole 201*e* for an inorganic adhesive formed on the side face 201*a* of the fixing frame 201 is not limited to that illustrated in FIG. 21C. For example, as shown in FIG. 34, multiple injection holes 201*e* may be provided. As described above, the injection holes 201*e* may be formed on the upper faces 201*b* or the bottom face 201*c* of the fixing frame 201. The injection holes 201*e* may not be formed in the fixing frame 201. Furthermore, cutouts 221 may be provided on the side faces 201*a* of the fixing frame 201, in order to easily insert the conductive electrodes having the terminals into the fixing frame 201.

In this embodiment, a case is described in which an opening is present between the upper faces 201*b* of the fixing frame 201. However, windows may be present between the upper faces 201*b* of the fixing frame 201 in a similar manner to that on the bottom face 201*c*.

Furthermore, it would be appreciated that a metal may be used without any processing as an energy absorber, or an energy absorber on whose surface an electrically insulating oxide film is formed may be used, as in Embodiment 1. In the former case, during discharge, a large amount of energy generated by the discharge can be absorbed in the entire region of the air gaps. On the other hand, in the latter case, electricity is locally discharged, and energy is absorbed, so that an oxide film at a point where electricity is discharged is evaporated, thereby increasing the gaps. As a result, during next discharge, electricity is discharged at another point, and thus the air gaps can be repeatedly used.

In this embodiment, a case is described in which spaces are formed in regions of energy absorbers, by windows, rails, or openings. However, it would be appreciated that spaces may be formed in regions of energy absorbers, using a method other than those described above.

Also in this embodiment, various modifications are possible regarding, for example, the number or the shape of the energy absorbers, as in Embodiment 1.

INDUSTRIAL APPLICABILITY

As described above, the arrester according to the present invention is useful as an arrester for protecting electrical equipment, electronic equipment, and the like by effectively absorbing a high voltage generated due to a lightning strike, in particular, induced lightning.

Figure 1:
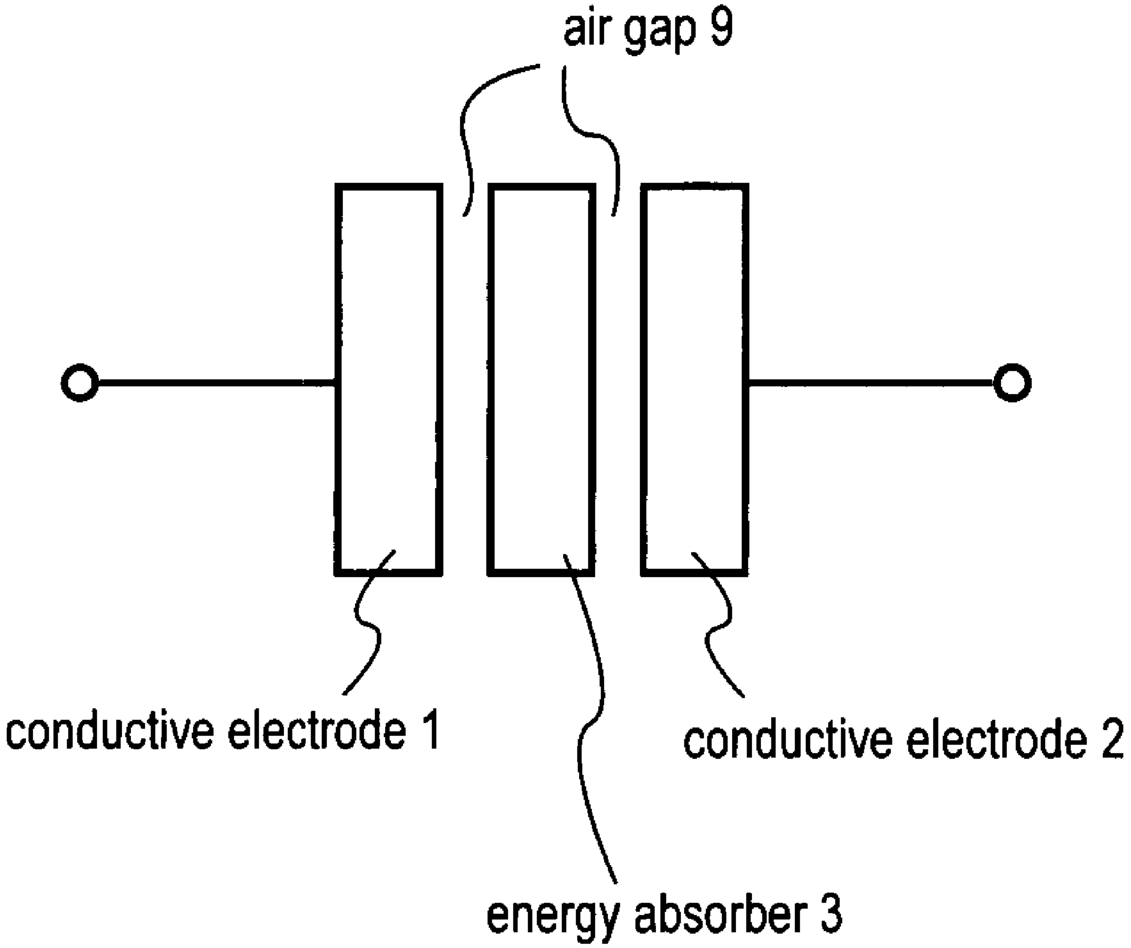
FIG. 1 is a schematic view schematically illustrating the configuration of an arrester according to Embodiment 1 of the present invention.
Figure 2A:
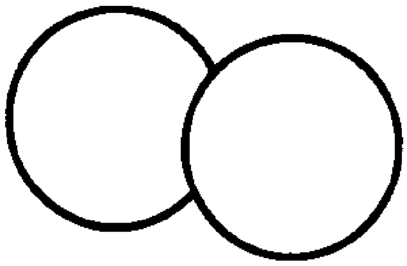
FIGS. 2A to 2G show examples of air gaps according to this embodiment.
Figure 2B:
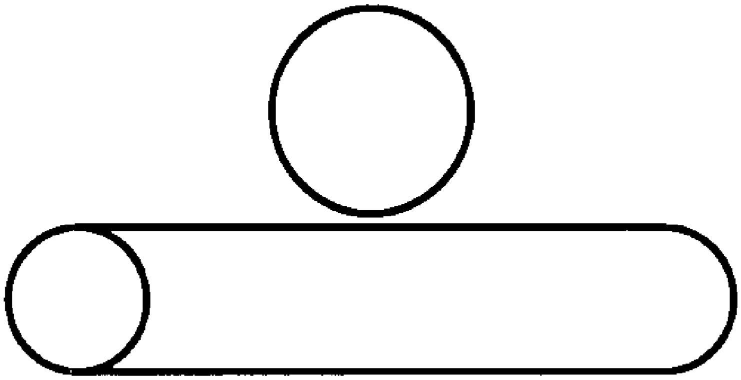
Figure 2C:
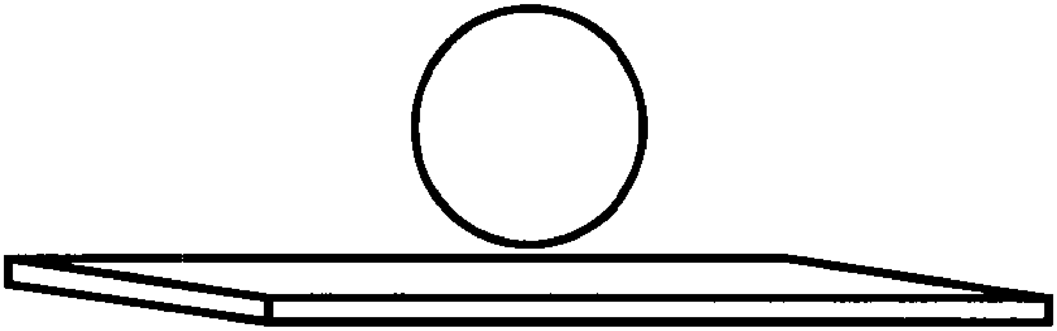
Figure 2D:
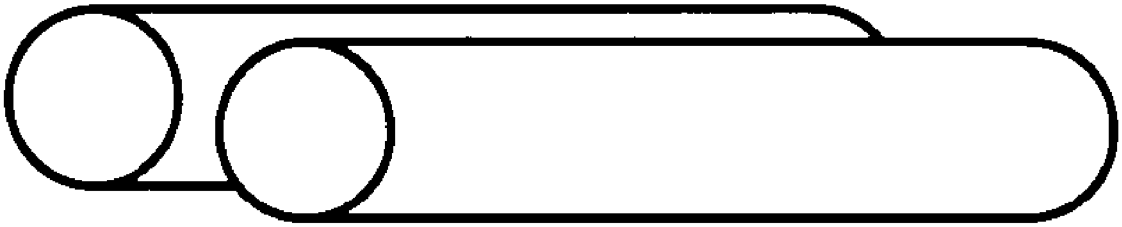
Figure 2E:
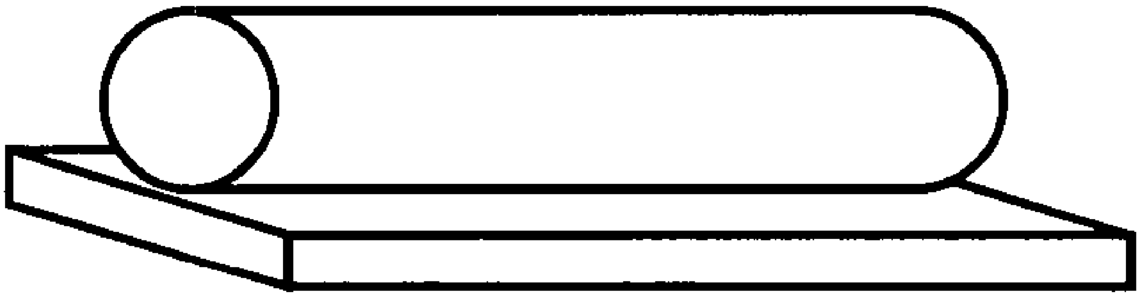
Figure 2F:
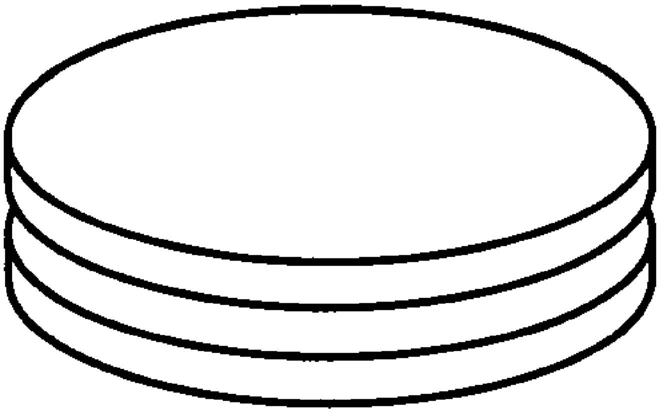
Figure 2G:
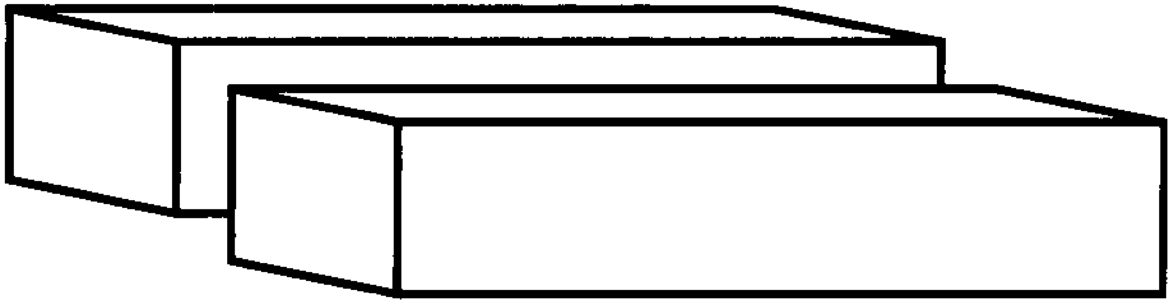
Figure 3:
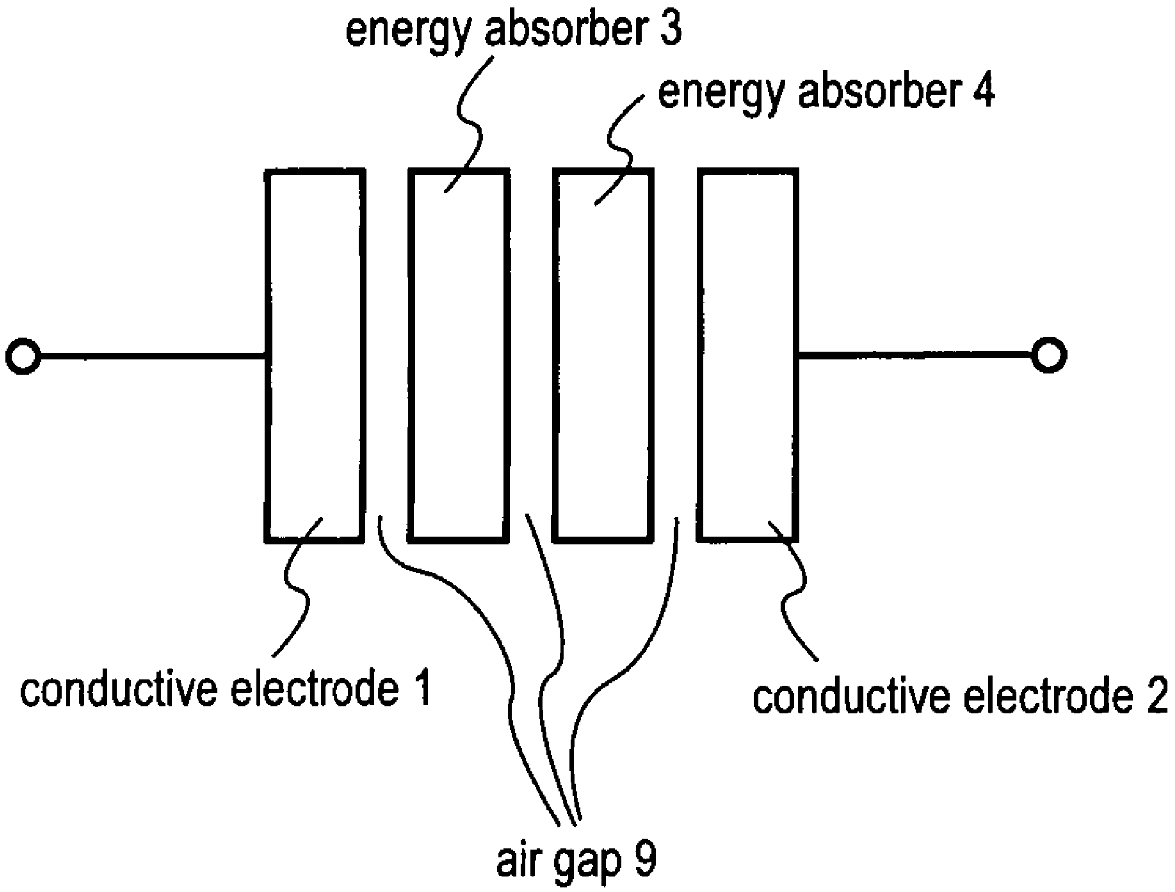
FIG. 3 is a schematic view schematically illustrating the configuration of the arrester according to this embodiment.
Figure 4:
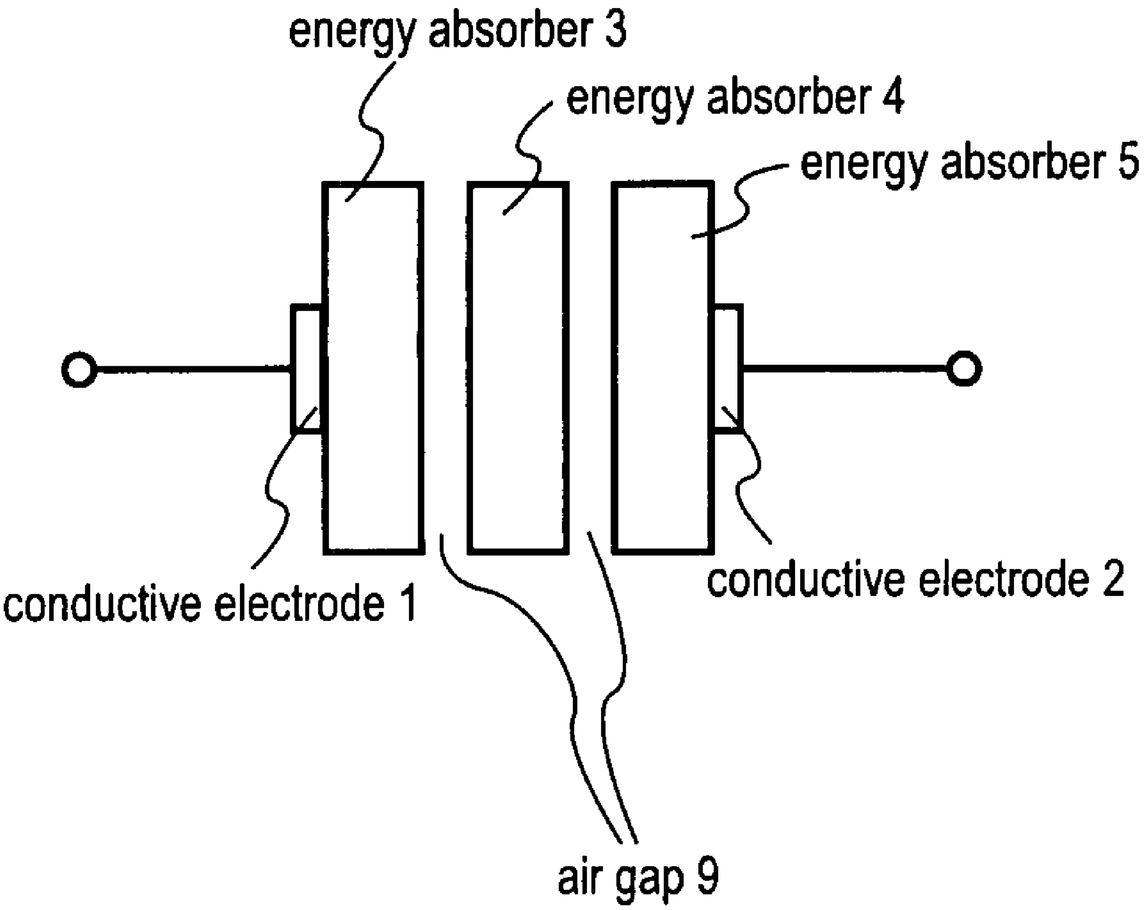
FIG. 4 is a schematic view schematically illustrating the configuration of the arrester according to this embodiment.
Figure 5:
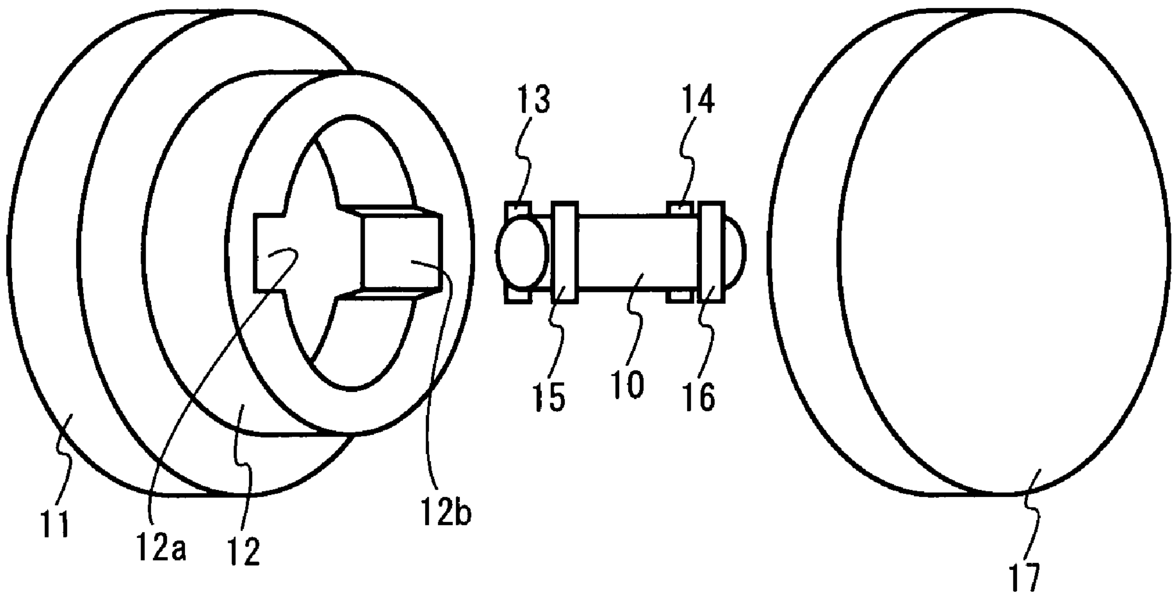
FIG. 5 is an exploded perspective view illustrating one example of the configuration of the arrester according to this embodiment.
Figure 6:
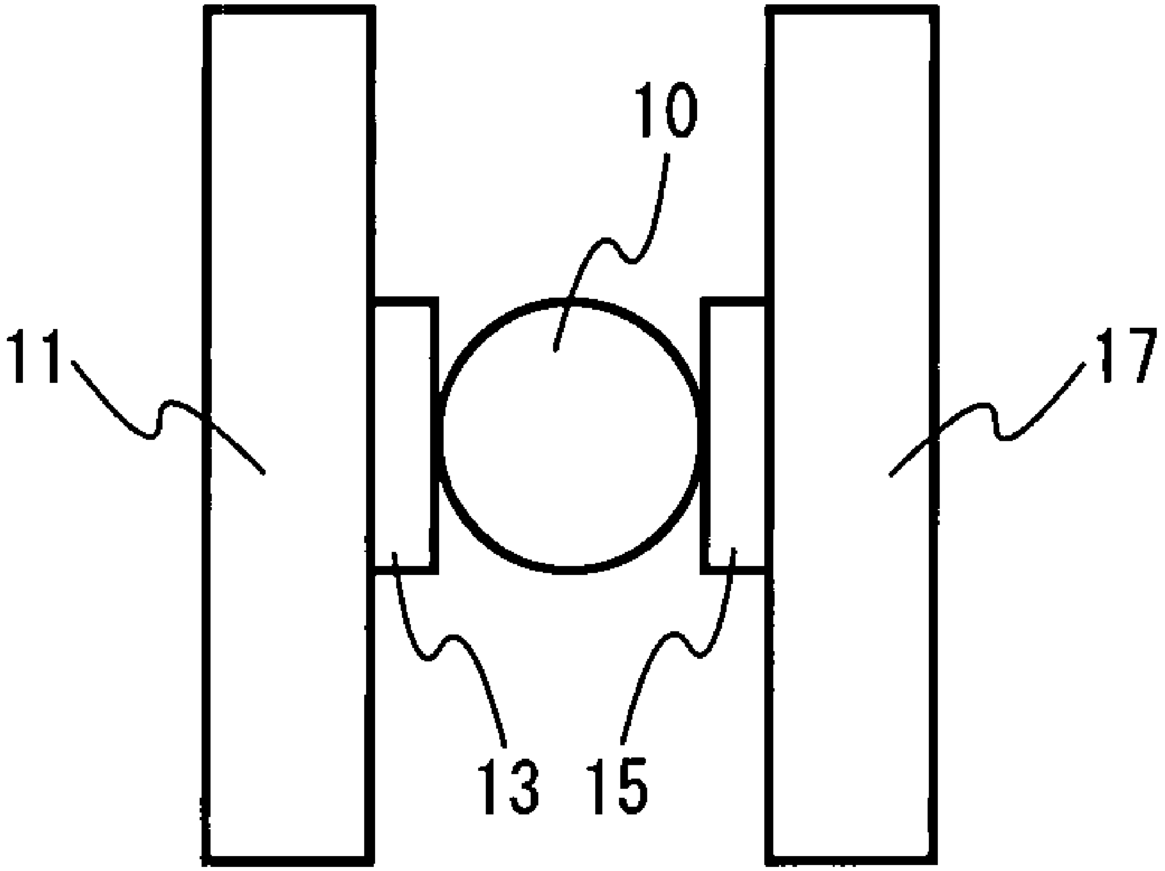
FIG. 6 is a schematic view schematically illustrating the configuration of the arrester according to this embodiment, viewed in the longitudinal direction of an energy absorber.
Figure 7:
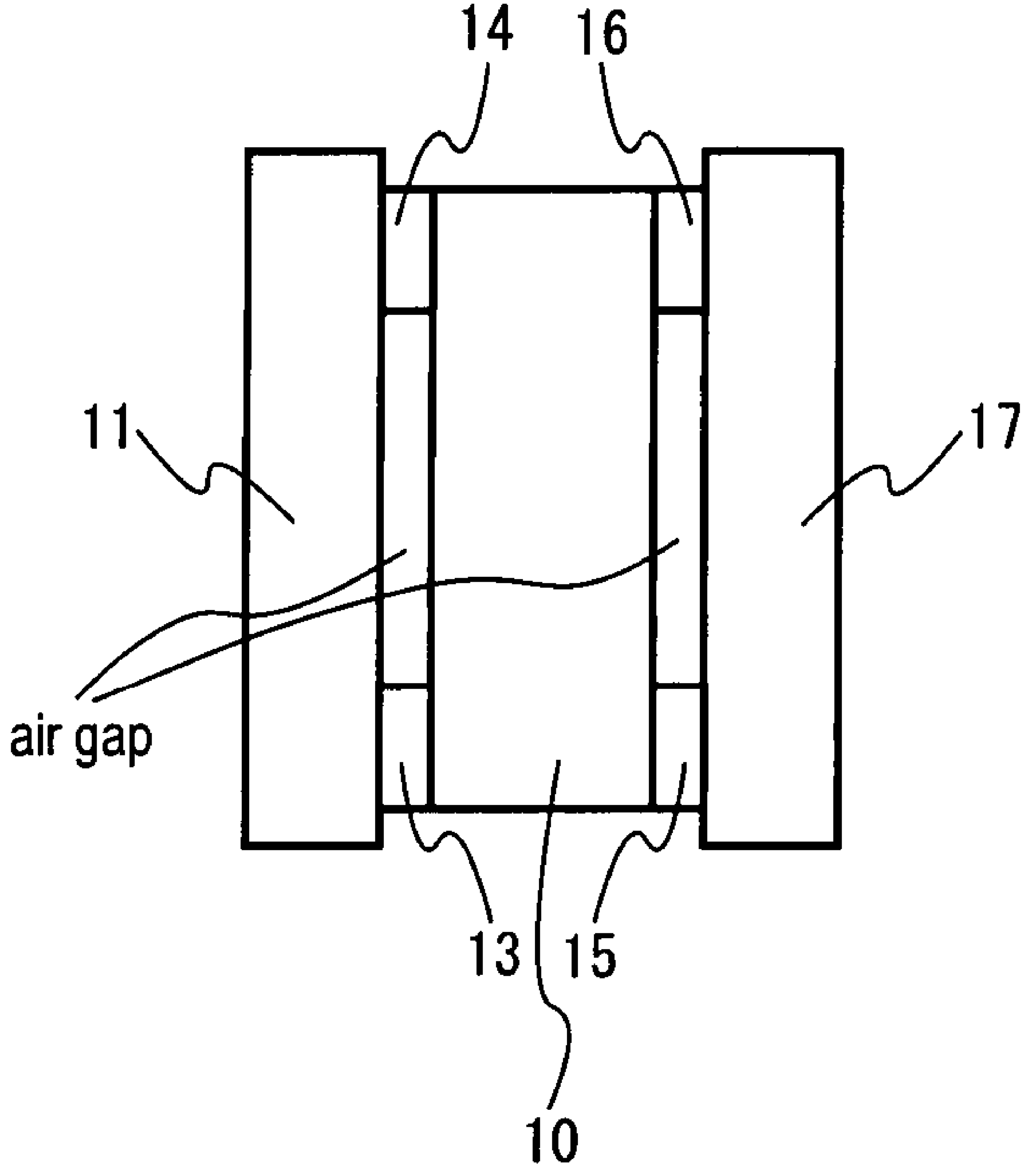
FIG. 7 is a schematic view schematically illustrating the configuration of the arrester according to this embodiment, viewed from above.
Figure 8:
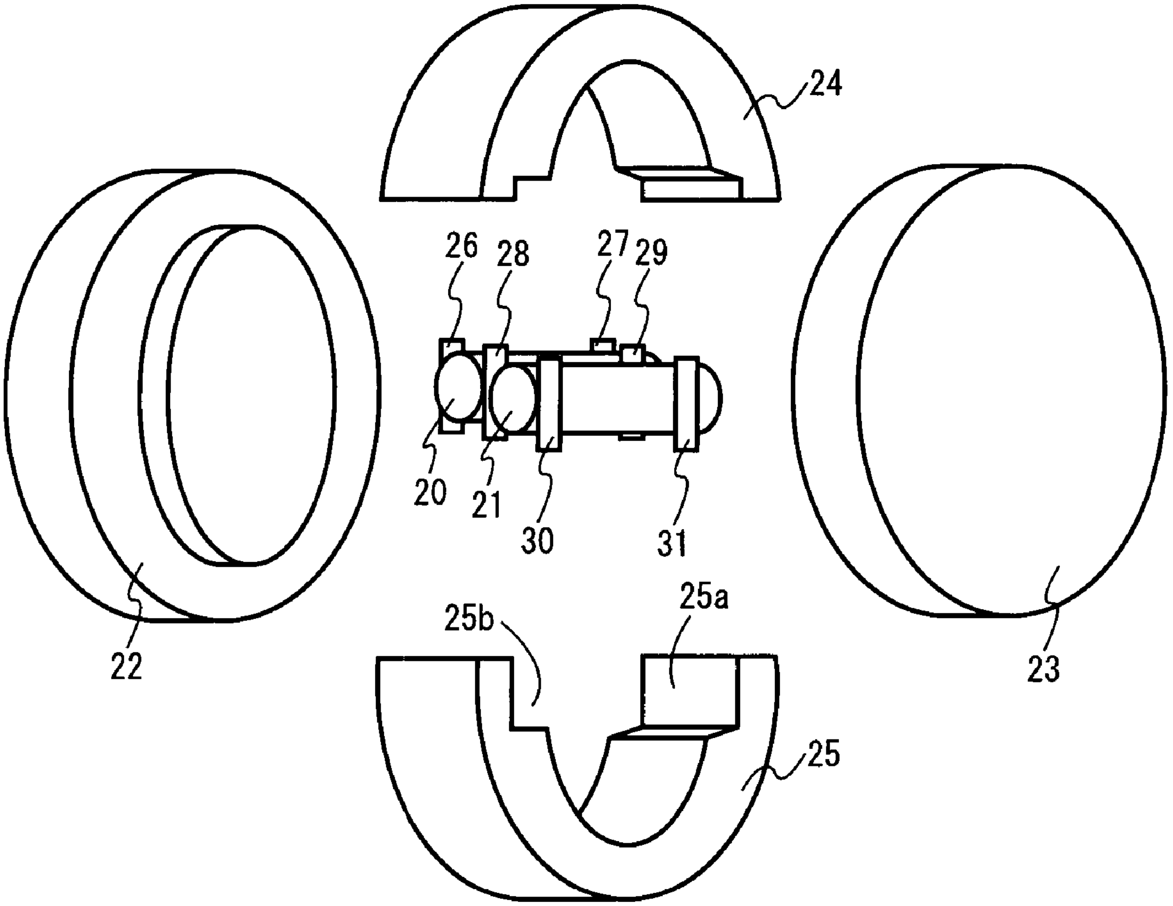
FIG. 8 is an exploded perspective view illustrating one example of the configuration of the arrester according to this embodiment.
Figure 9:
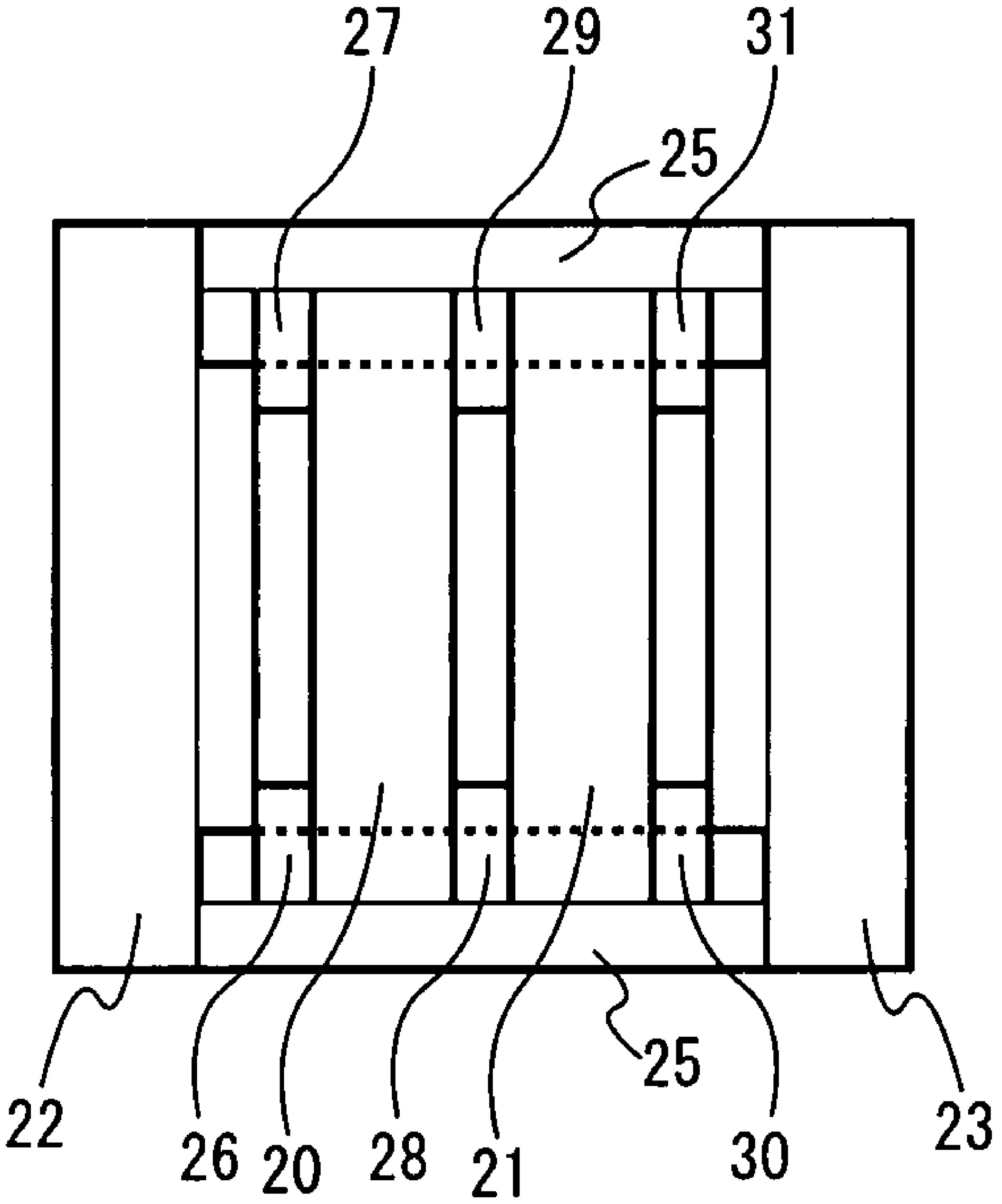
FIG. 9 is a top view illustrating one example of the configuration of the arrester according to this embodiment in the assembling process.
Figure 10:
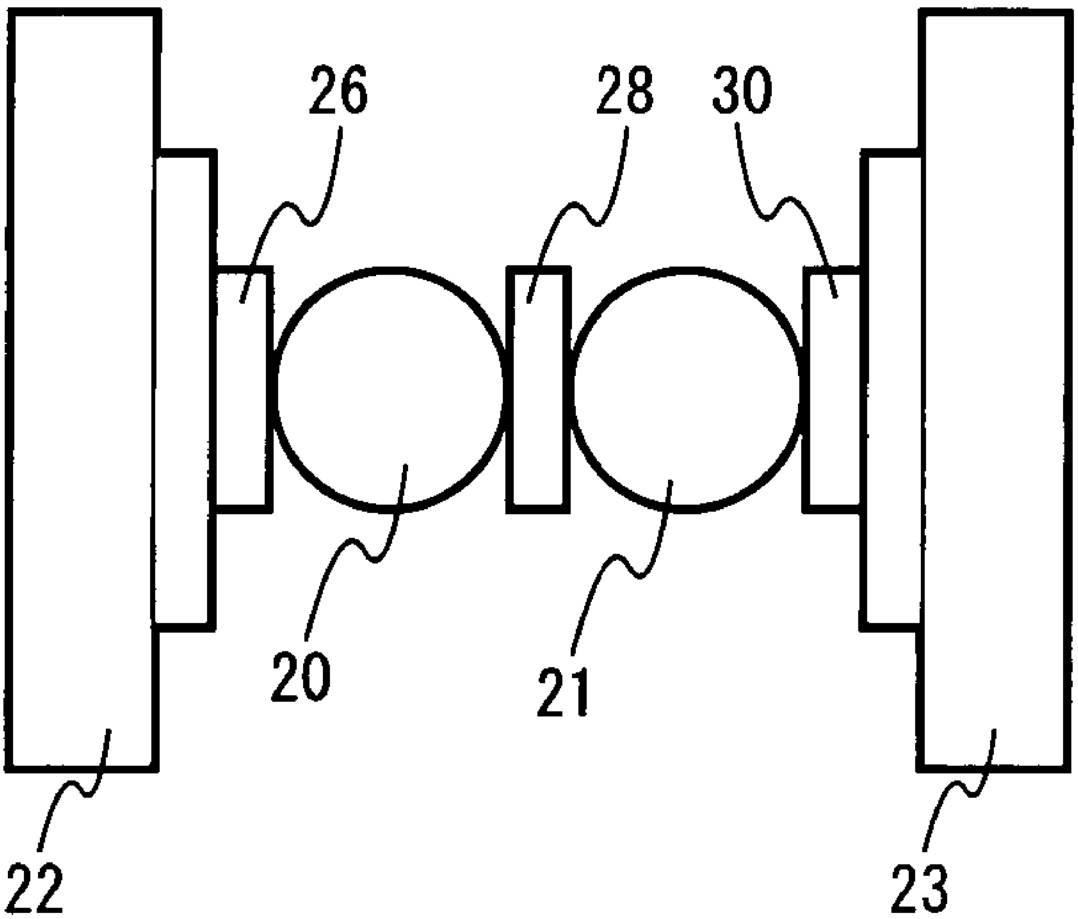
FIG. 10 is a schematic view schematically illustrating the configuration of the arrester according to this embodiment, viewed in the longitudinal direction of energy absorbers.
Figure 11:
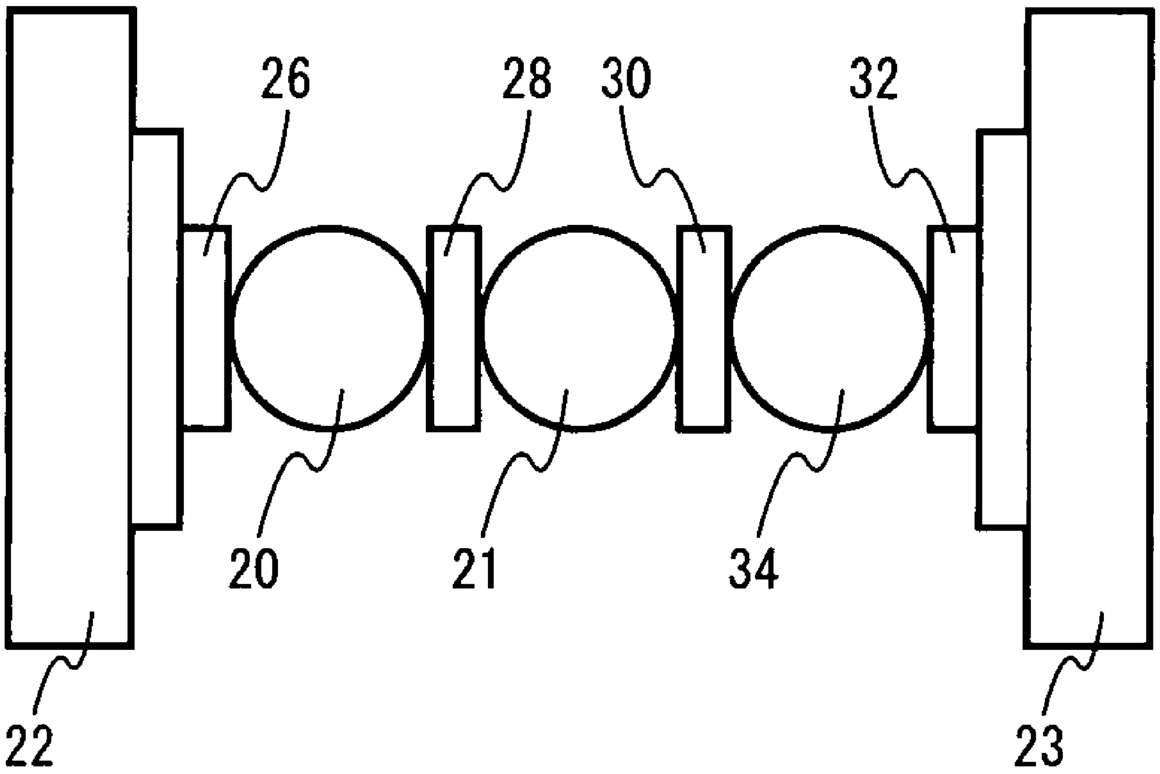
FIG. 11 is a schematic view schematically illustrating the configuration of the arrester according to this embodiment, viewed in the longitudinal direction of energy absorbers.
Figure 12:
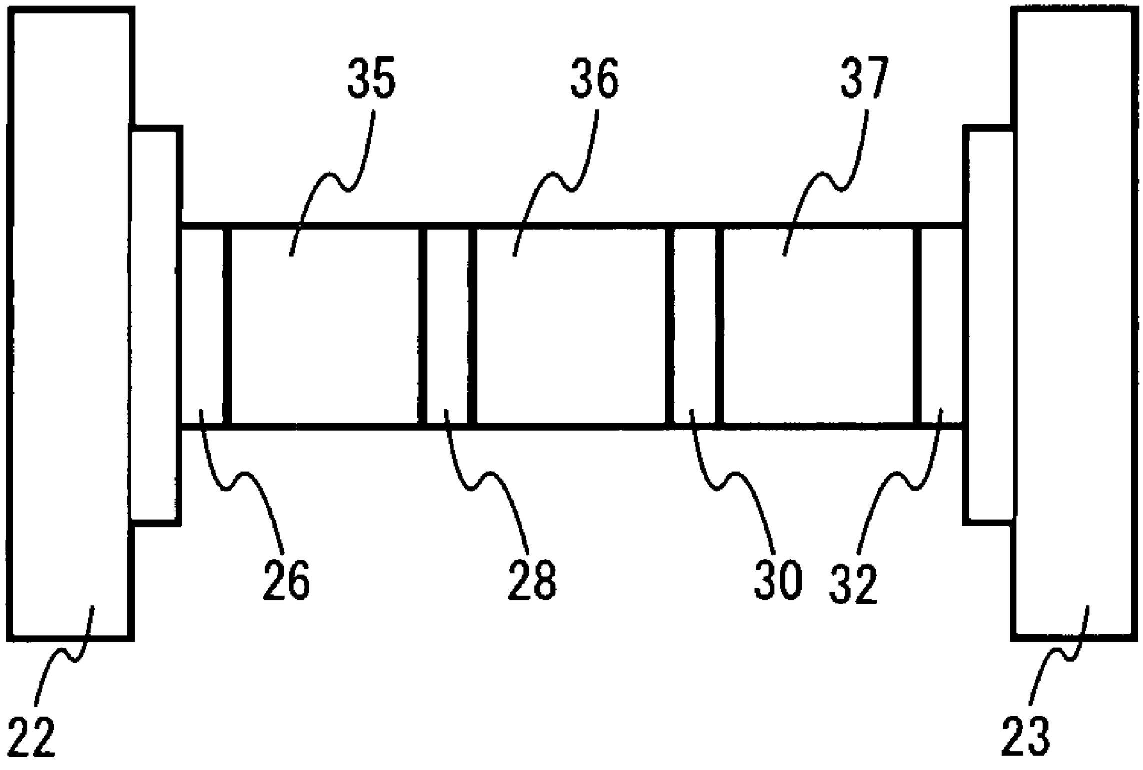
FIG. 12 is a schematic view schematically illustrating the configuration of the arrester according to this embodiment, viewed in the longitudinal direction of energy absorbers.
Figure 13:
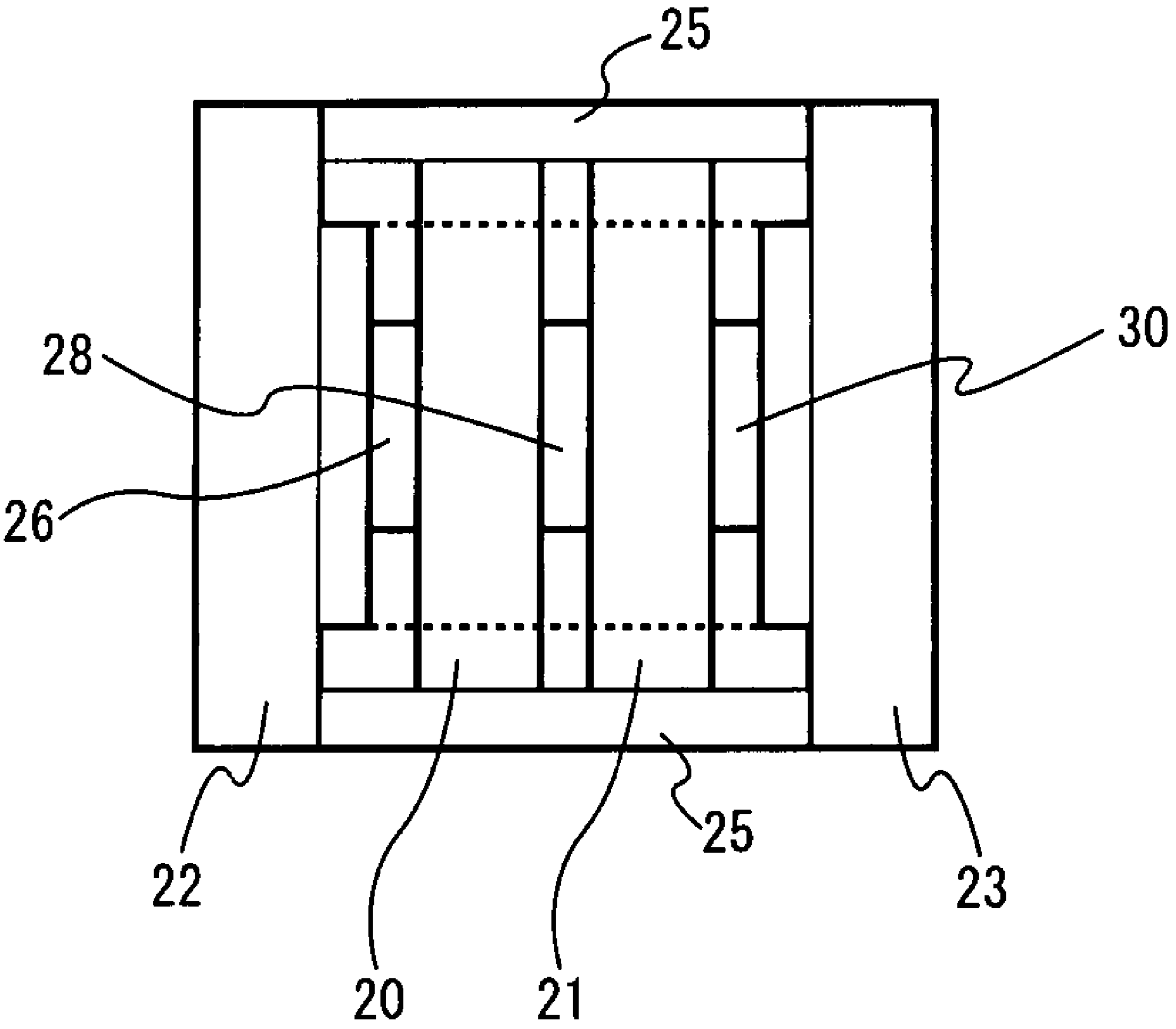
FIG. 13 is a top view illustrating one example of the configuration of the arrester according to this embodiment in the assembling process.
Figure 14:
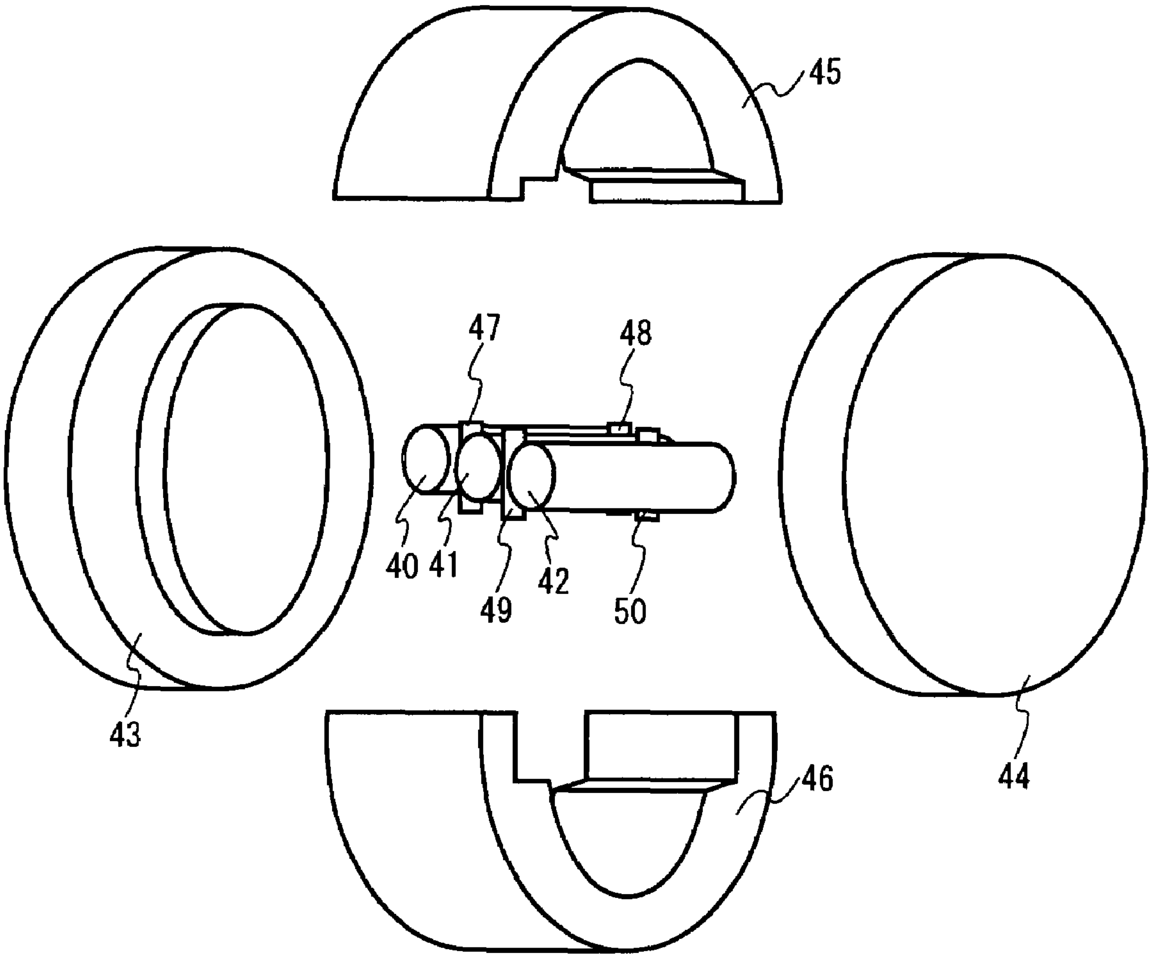
FIG. 14 is an exploded perspective view illustrating one example of the configuration of the arrester according to this embodiment.
Figure 15:
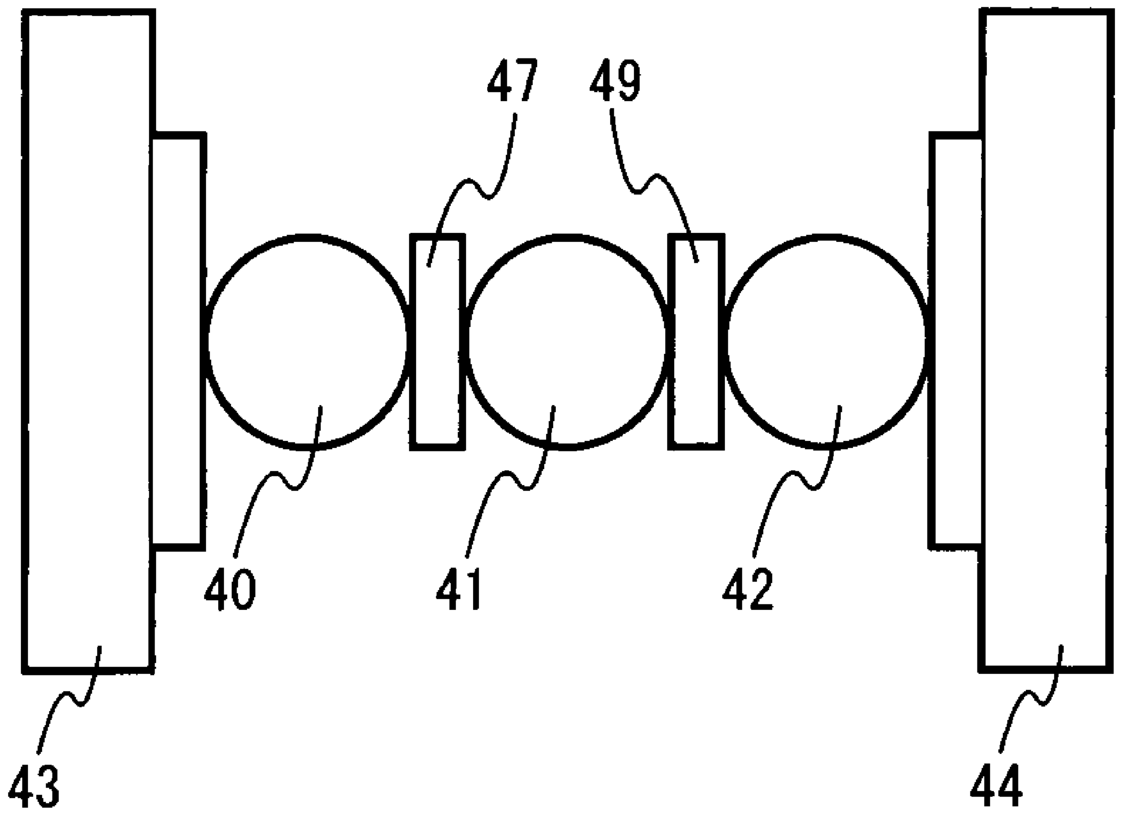
FIG. 15 is a schematic view schematically illustrating the configuration of the arrester according to this embodiment, viewed in the longitudinal direction of energy absorbers.
Figure 16:
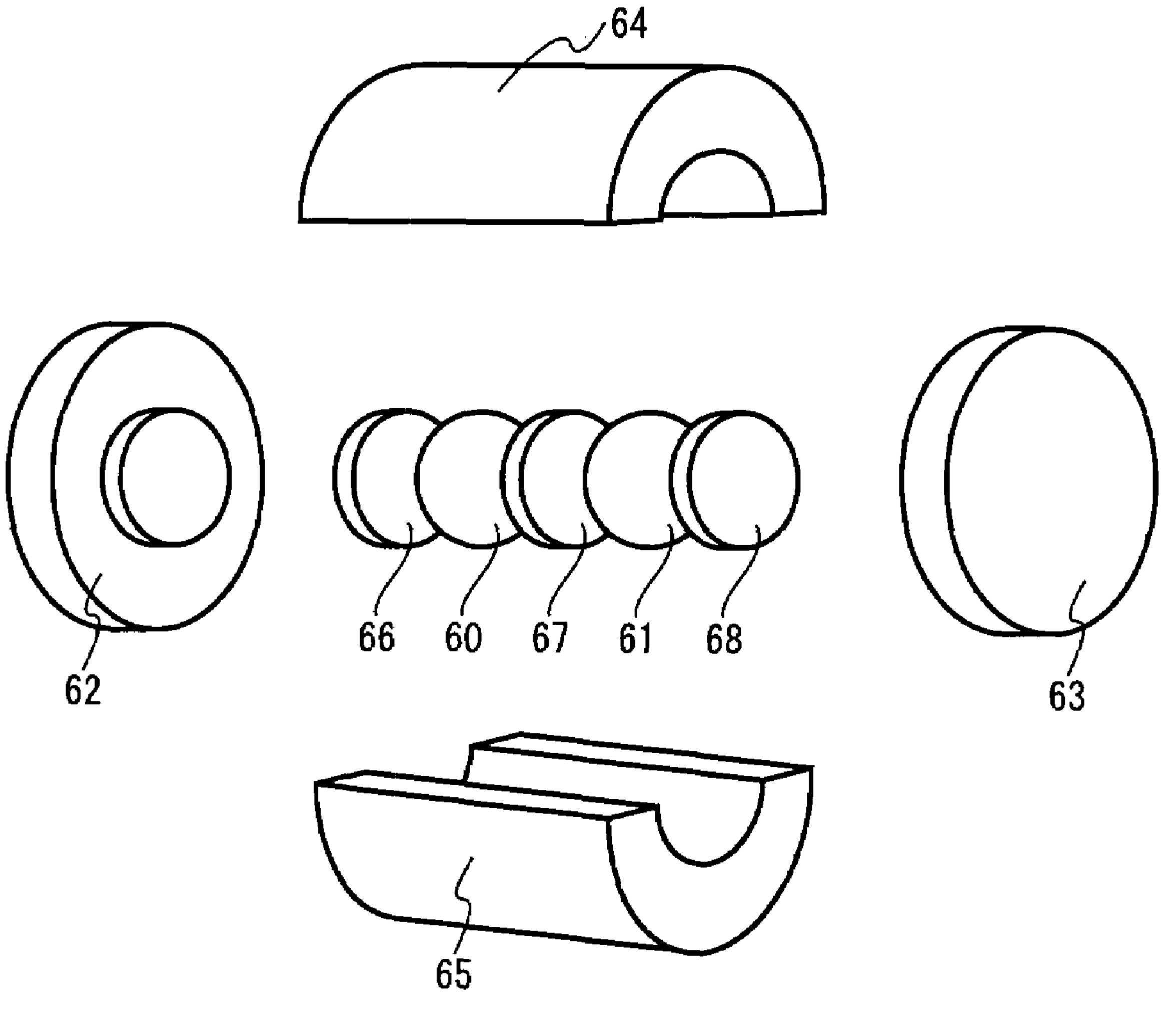
FIG. 16 is an exploded perspective view illustrating one example of the configuration of the arrester according to this embodiment.
Figure 17:
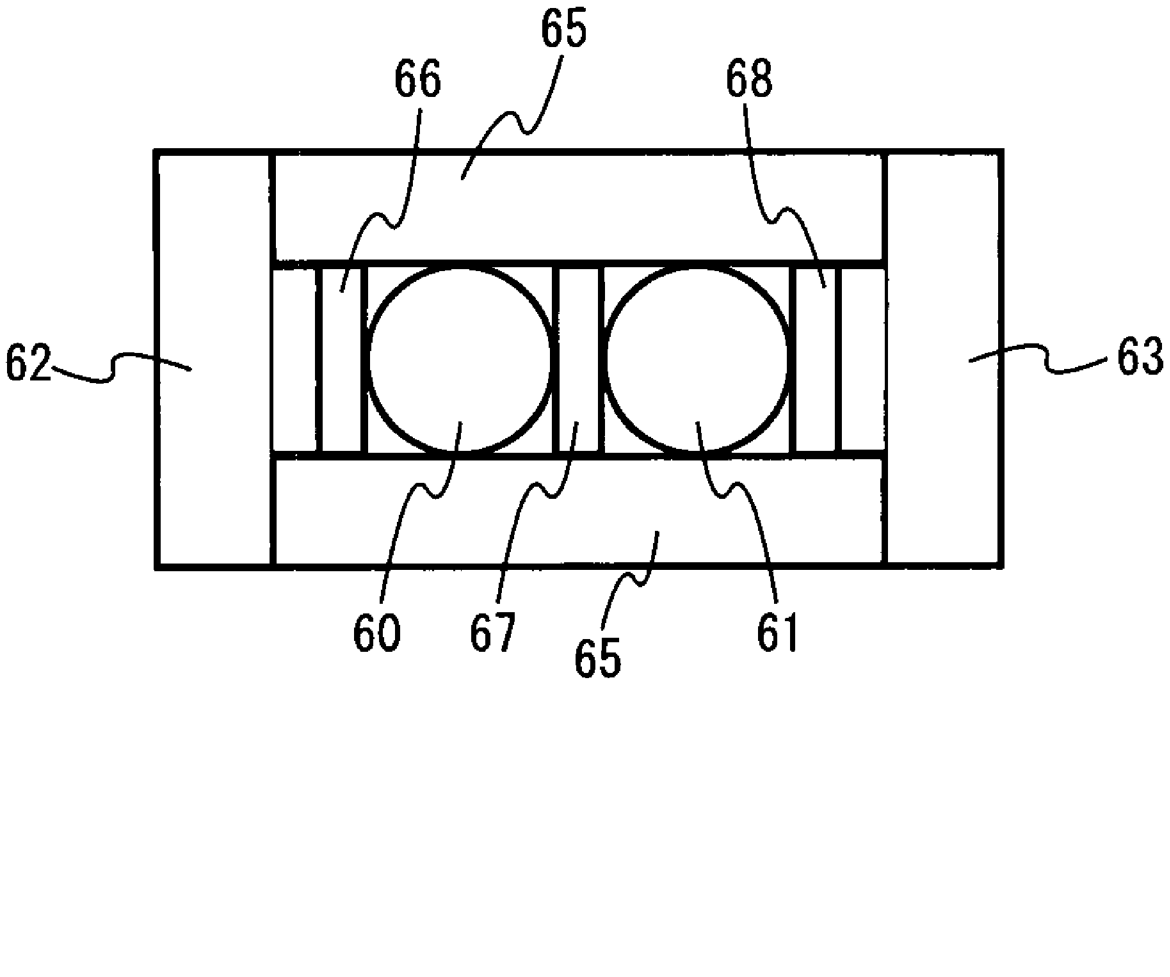
FIG. 17 is a top view illustrating one example of the configuration of the arrester according to this embodiment in the assembling process.
Figure 18:
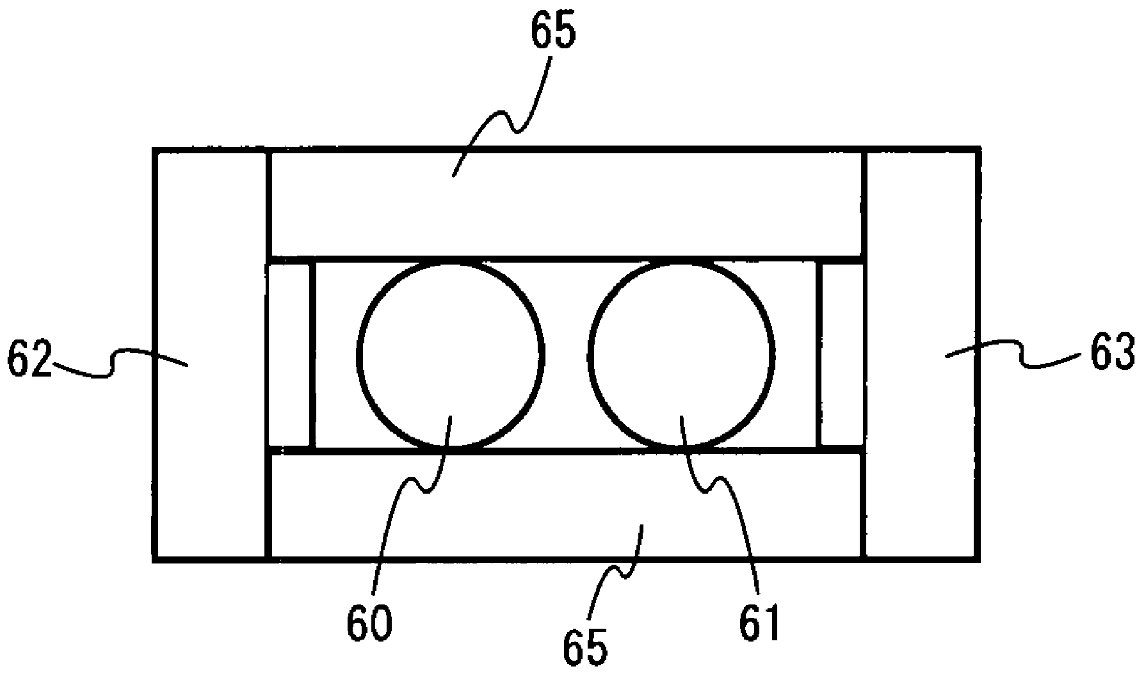
FIG. 18 is a top view illustrating one example of the configuration of the arrester according to this embodiment in the assembling process.
Figure 19A:
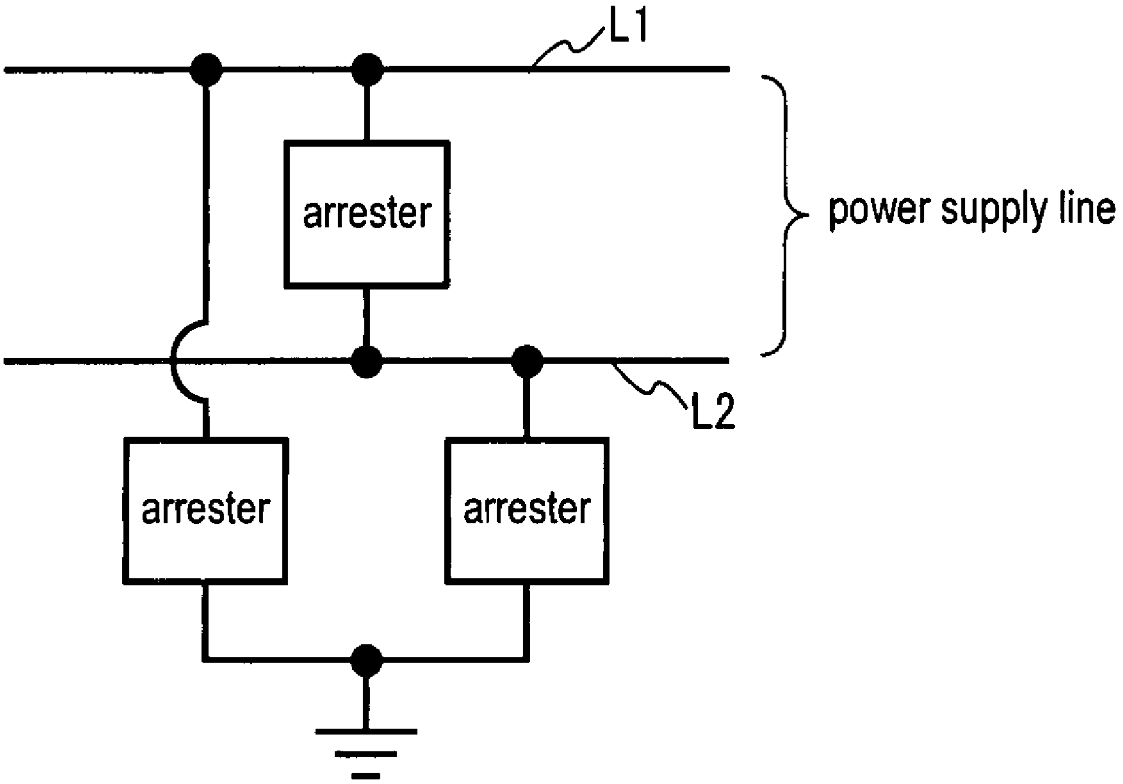
FIGS. 19A and 19B show diagrams for illustrating the application of the arrester according to this embodiment.
Figure 19B:
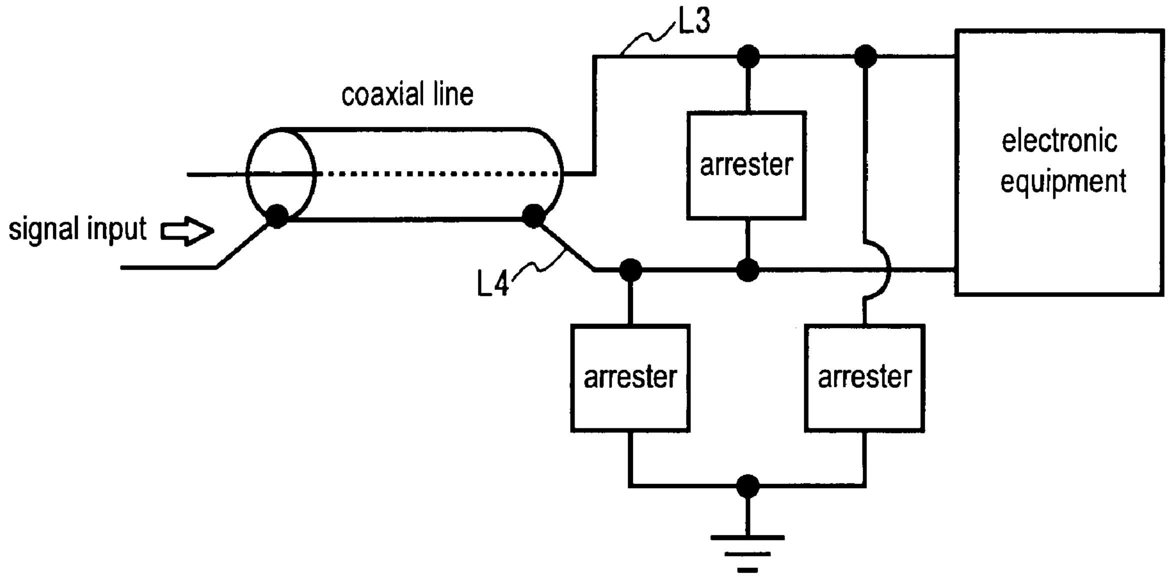
Figure 20:
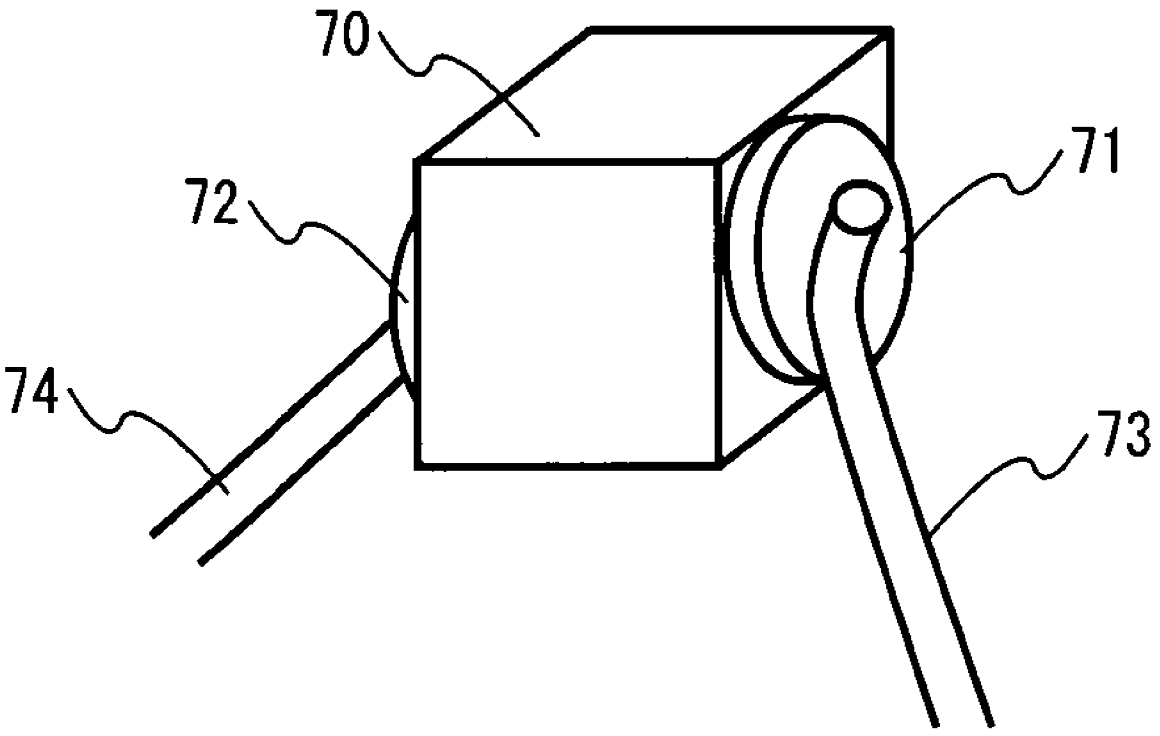
FIG. 20 is a view for illustrating the application of the arrester according to this embodiment.
Figure 21A:
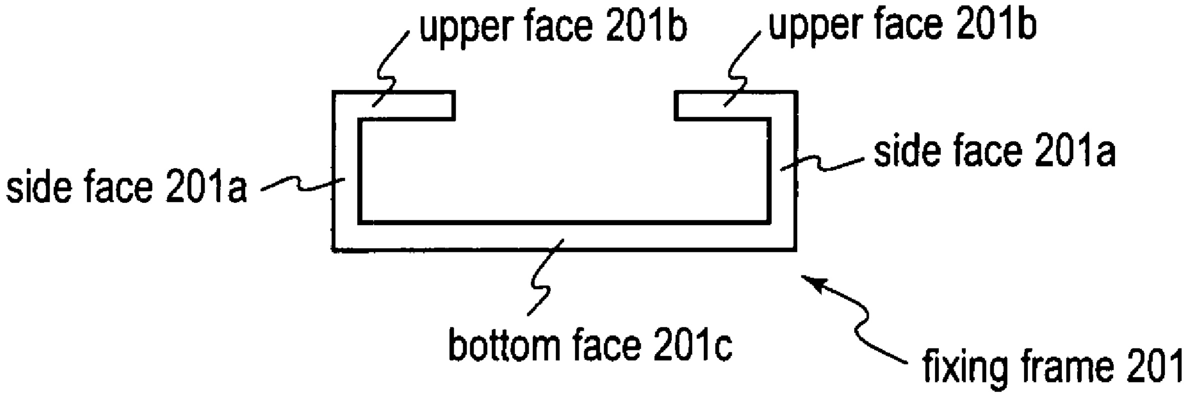
FIGS. 21A to 21C show a fixing frame according to Embodiment 2 of the present invention.
Figure 21B:
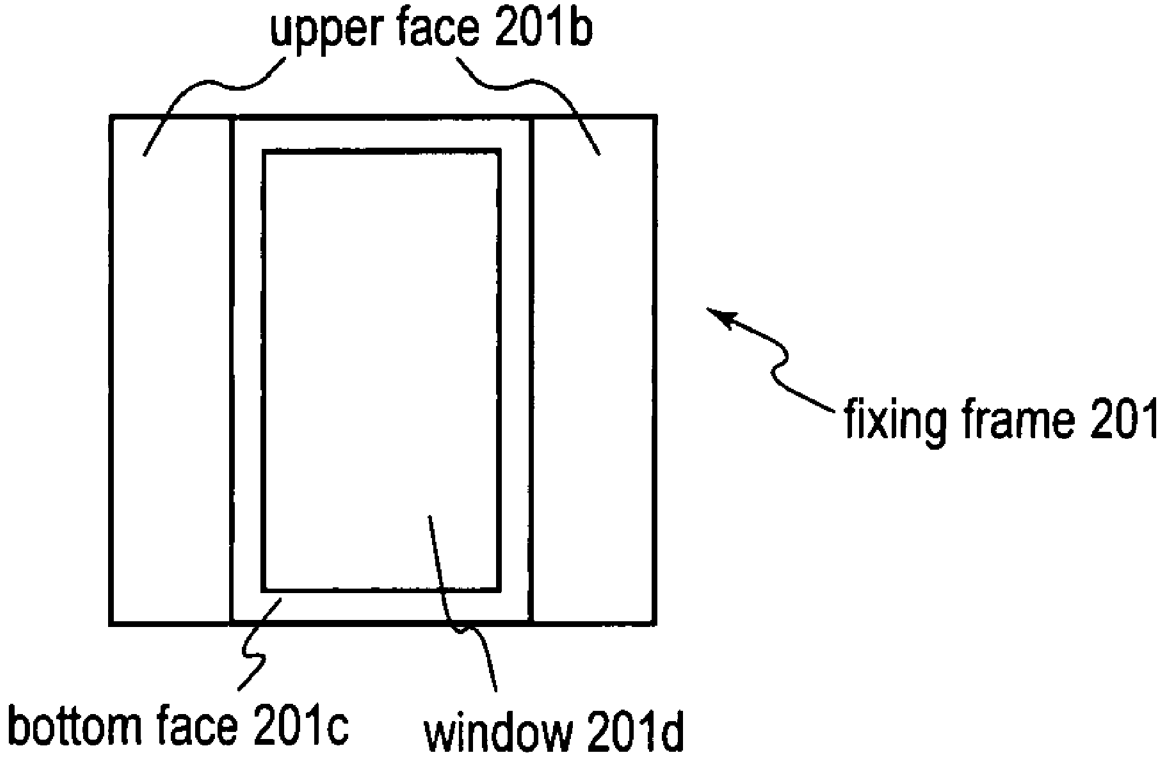
Figure 21C:
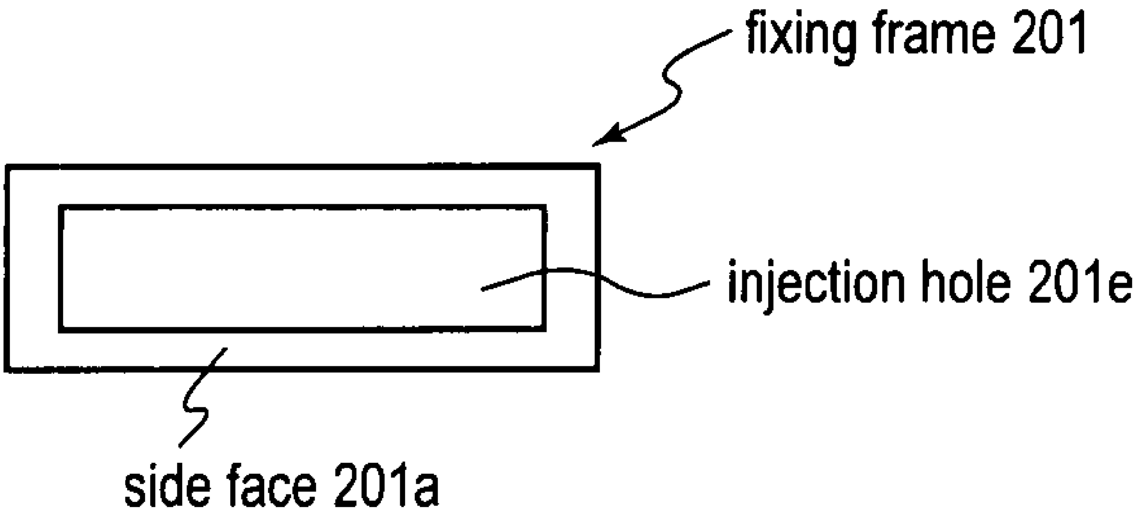
Figure 22A:
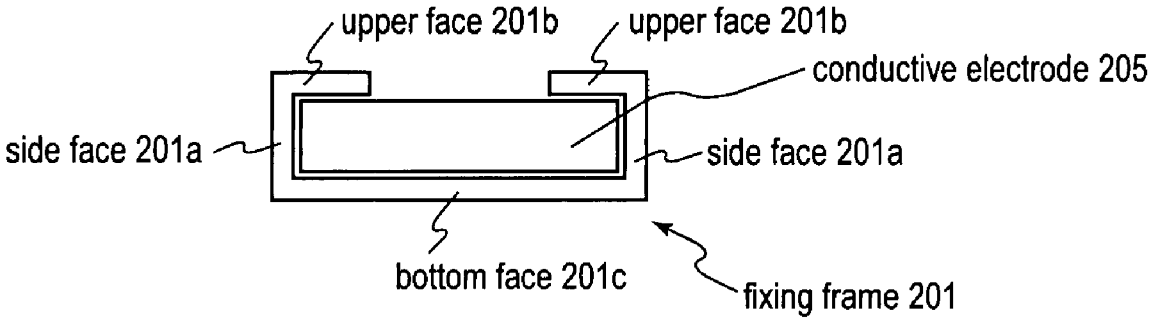
FIGS. 22A to 22C show the fixing frame for fixing energy absorbers and conductive electrodes in this embodiment.
Figure 22B:
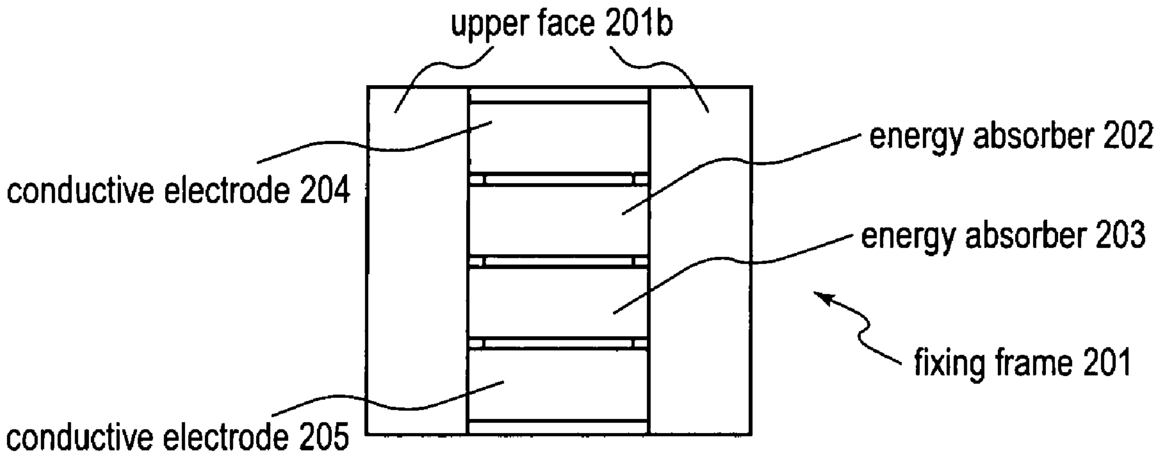
Figure 22C:
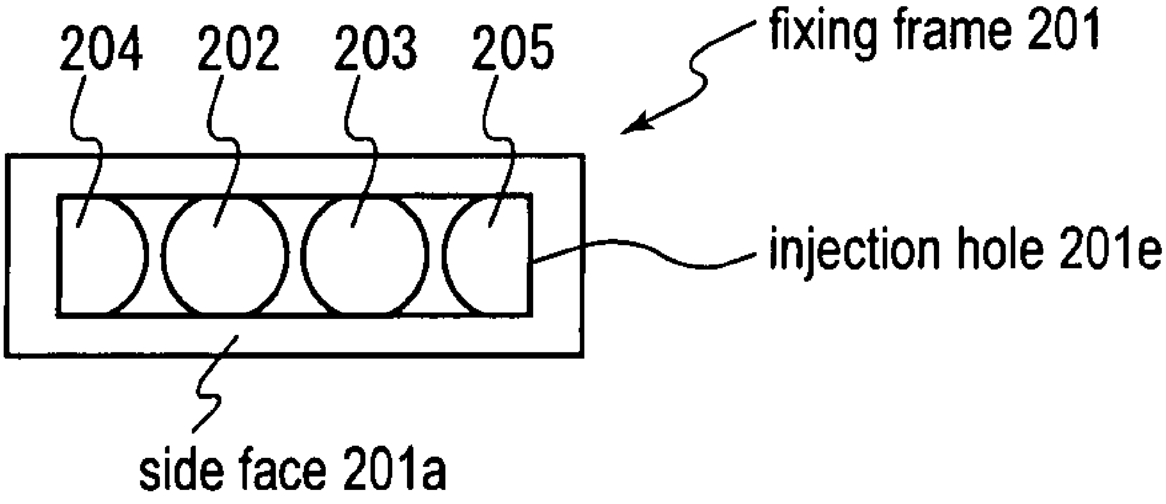
Figure 23A:
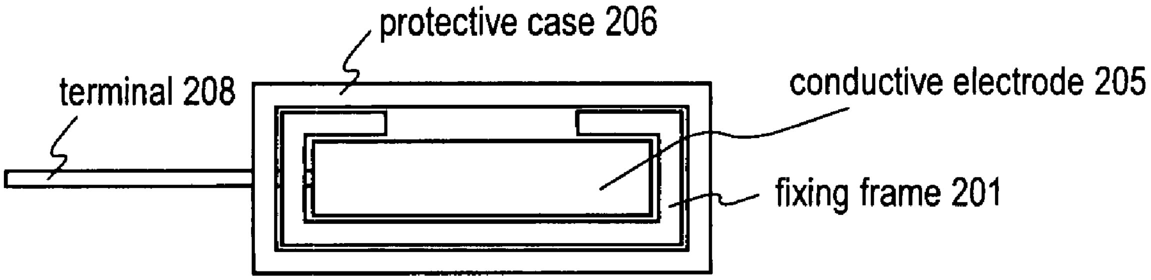
FIGS. 23A and 23B show see-through views illustrating the arrester according to this embodiment.
Figure 23B:
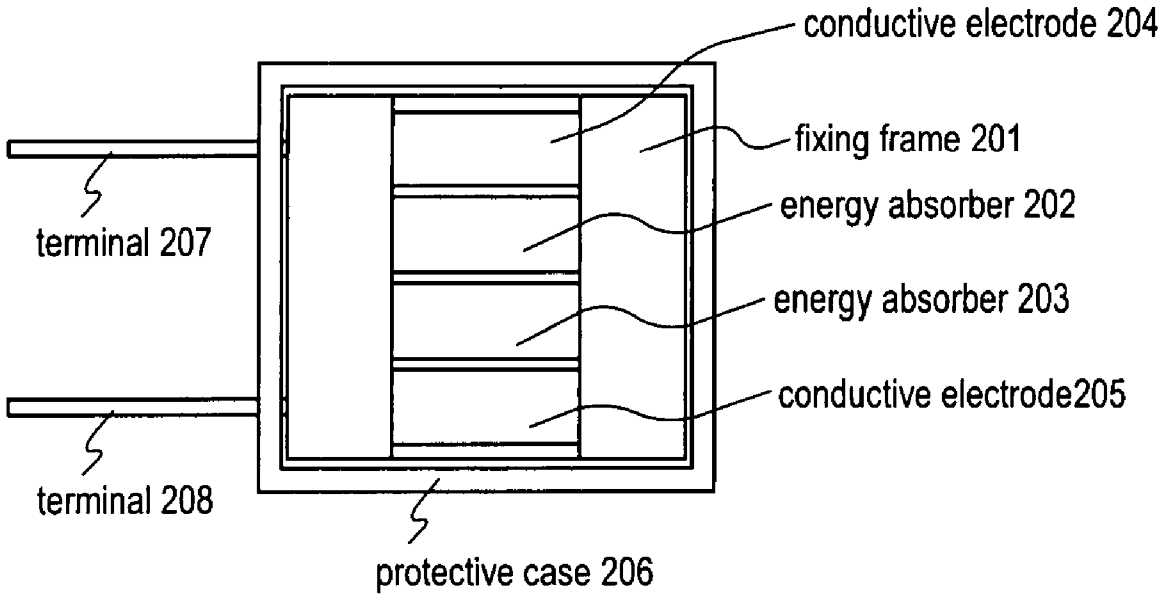
Figure 24:
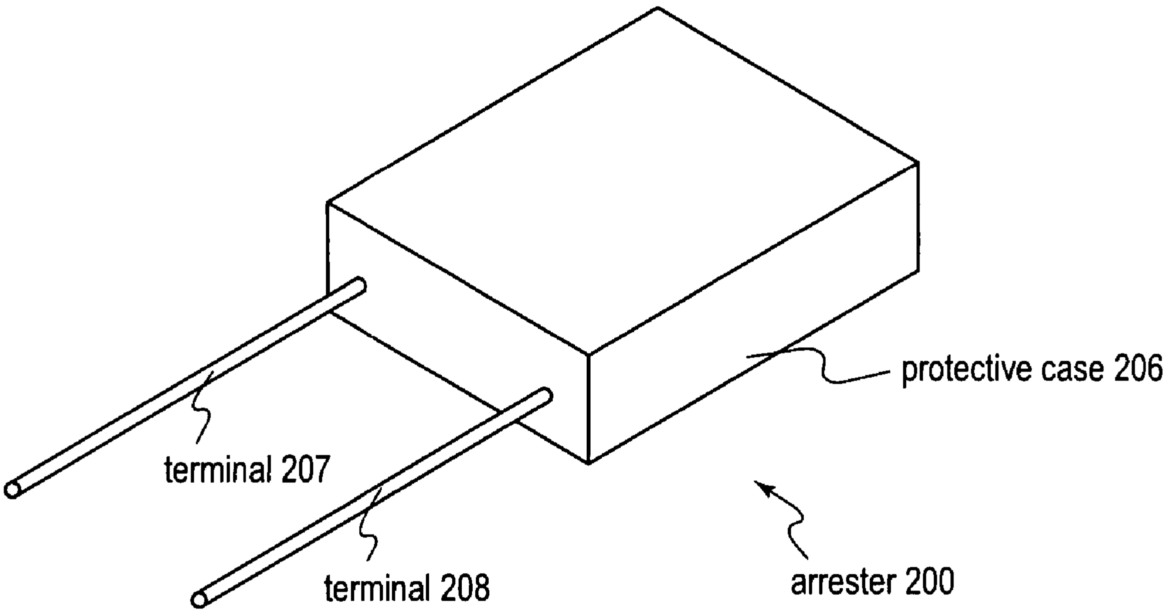
FIG. 24 is a schematic view illustrating the external appearance of the arrester according to this embodiment.
Figure 25:
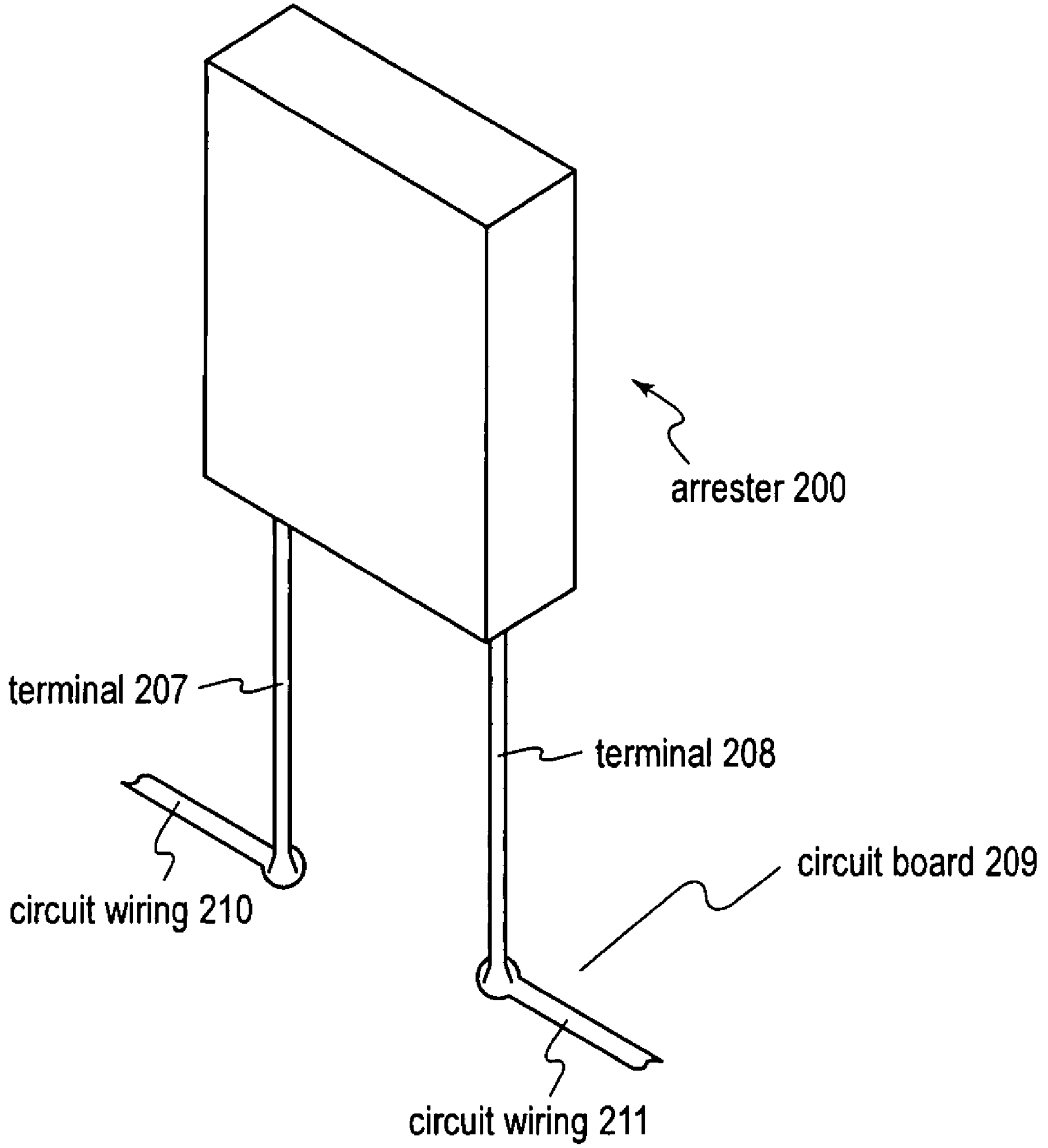
FIG. 25 is a view illustrating one example of a circuit board to which the arrester according to this embodiment is connected.
Figure 26:
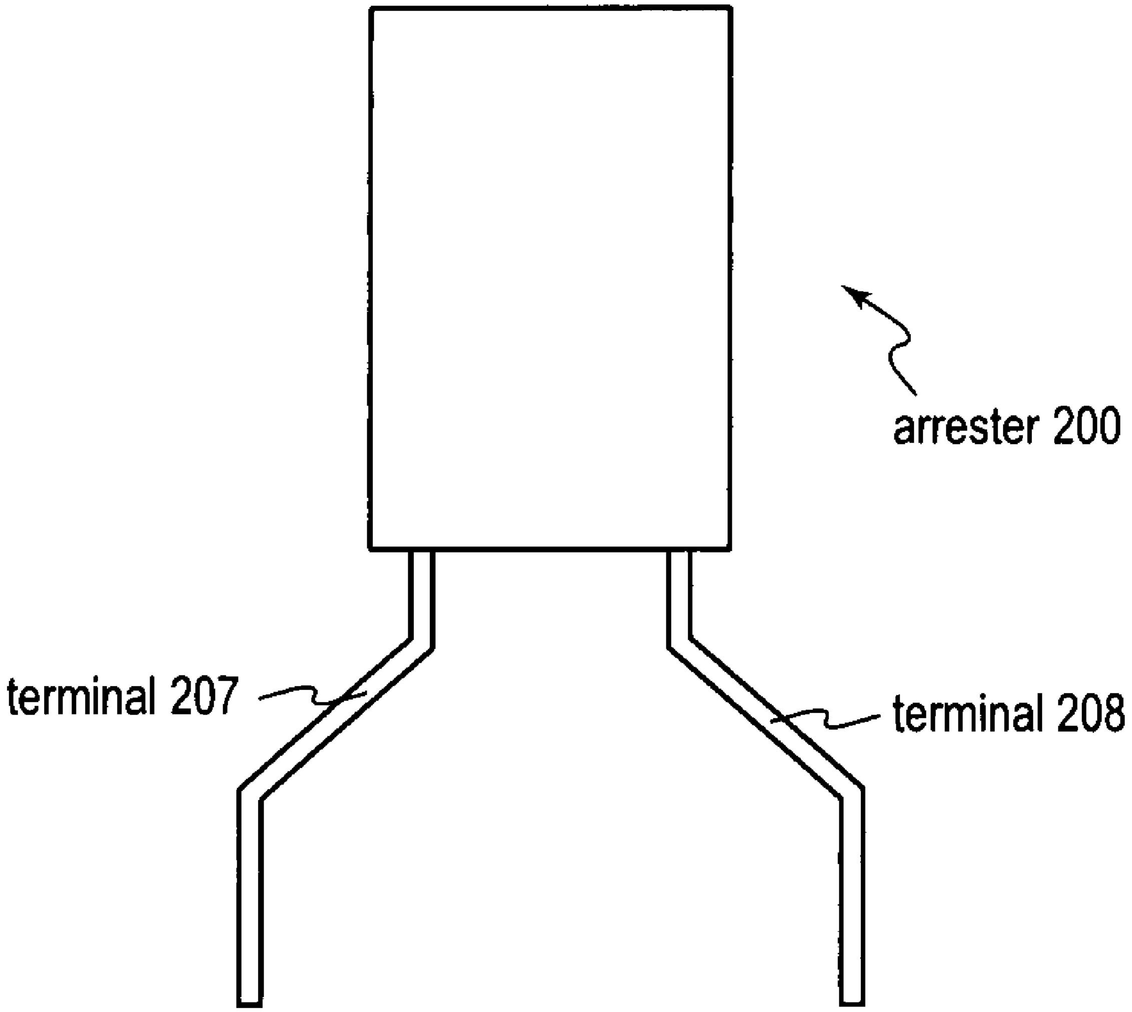
FIG. 26 is a schematic view illustrating the arrester according to this embodiment.
Figure 27A:
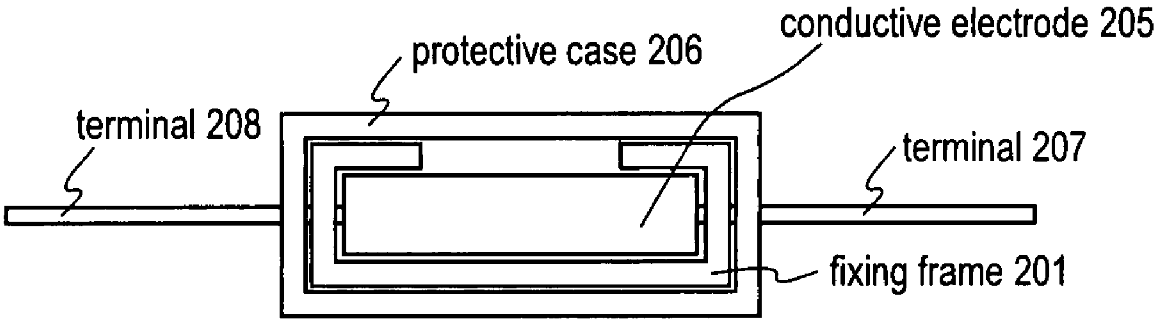
FIGS. 27A and 27B show see-through views illustrating the arrester according to this embodiment.
Figure 27B:
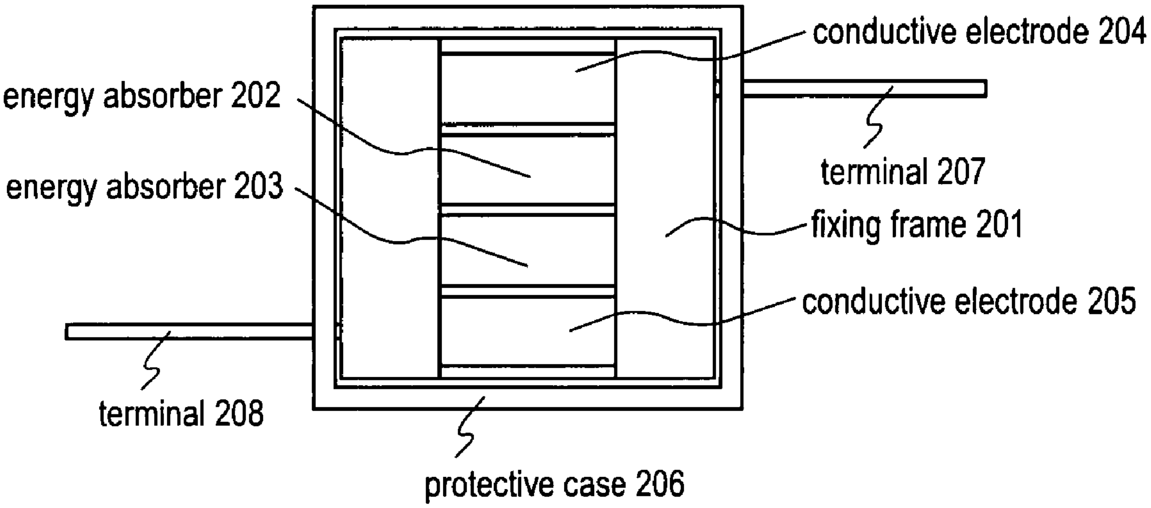
Figure 28A:
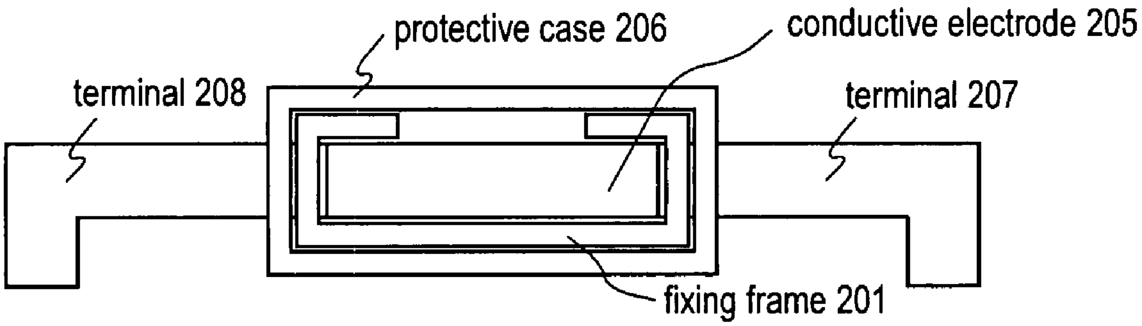
FIGS. 28A to 28C show see-through views illustrating the arrester according to this embodiment.
Figure 28B:
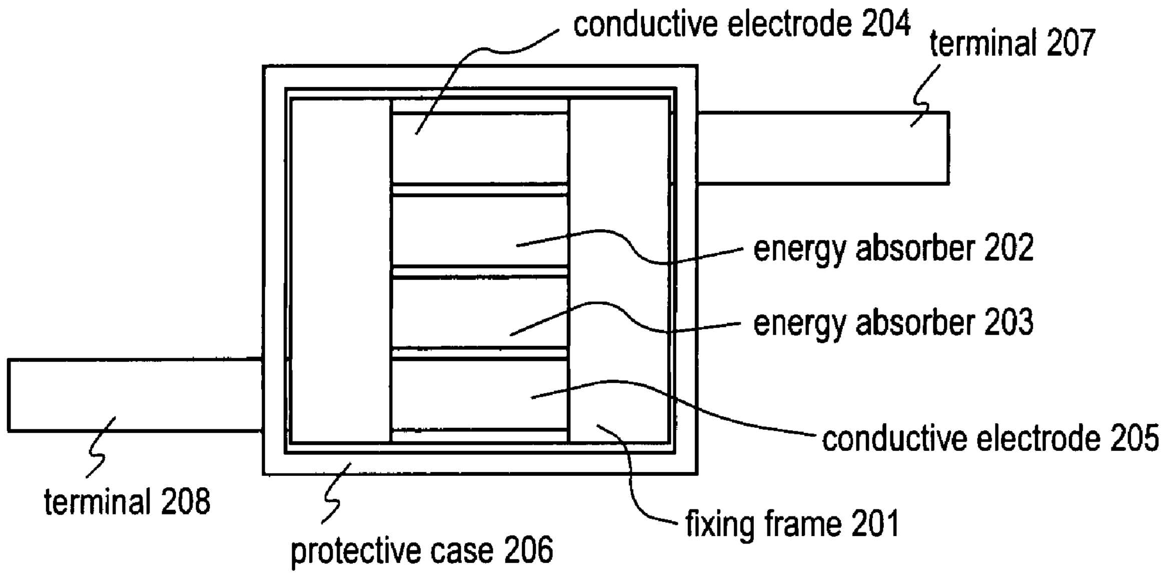
Figure 28C:
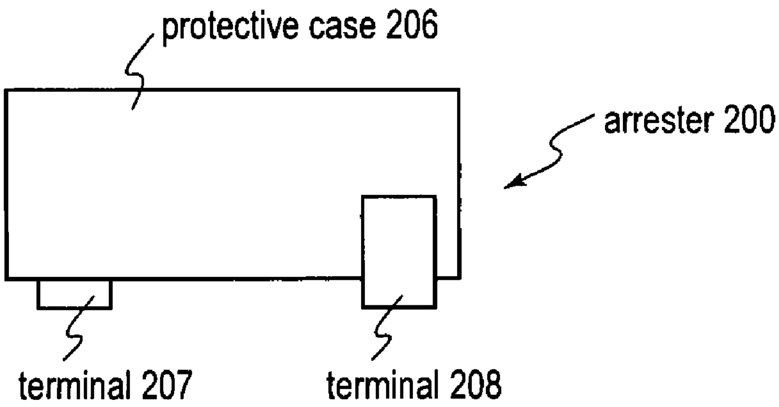
Figure 29:
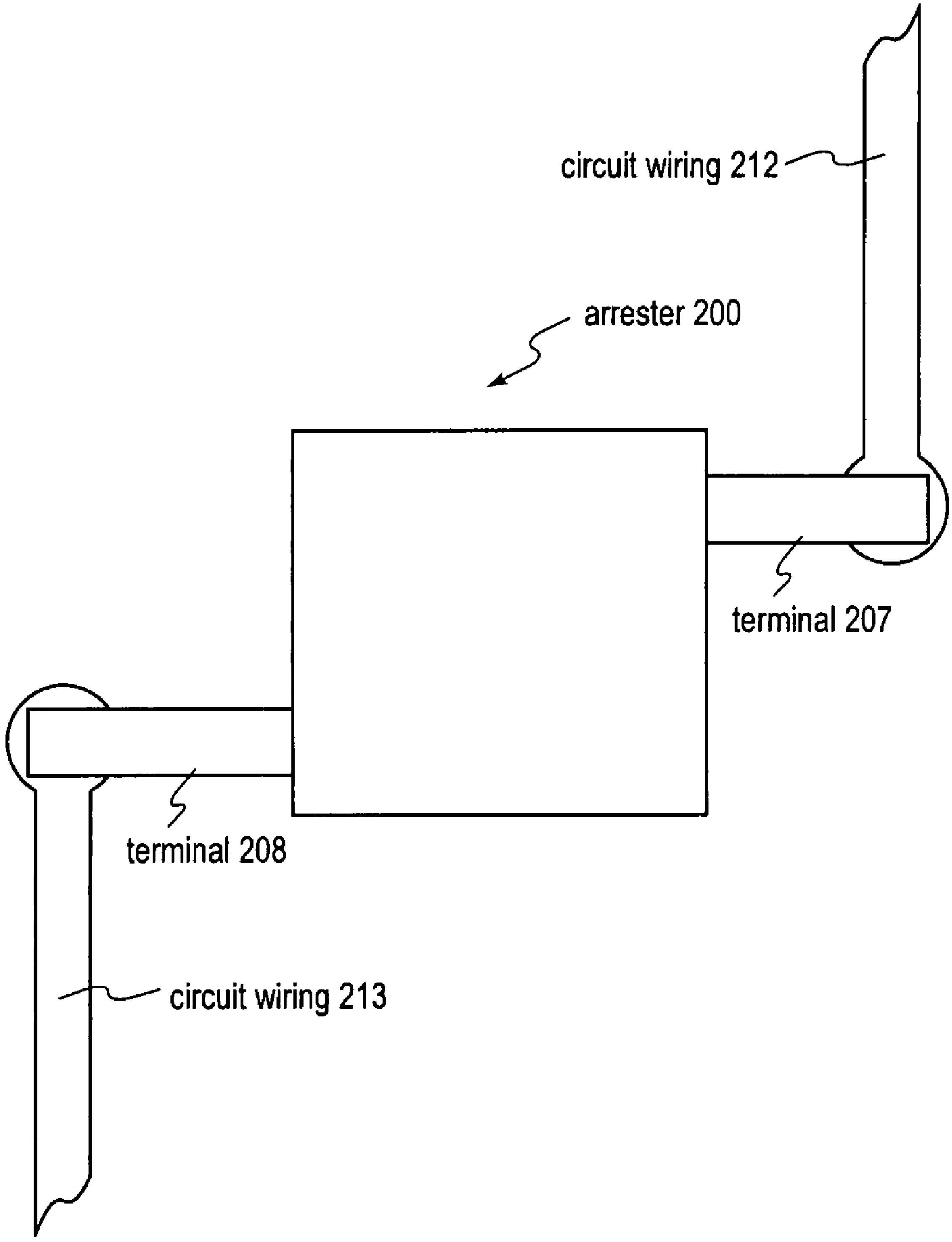
FIG. 29 is a view illustrating one example of a circuit board to which the arrester according to this embodiment is connected.
Figure 30A:
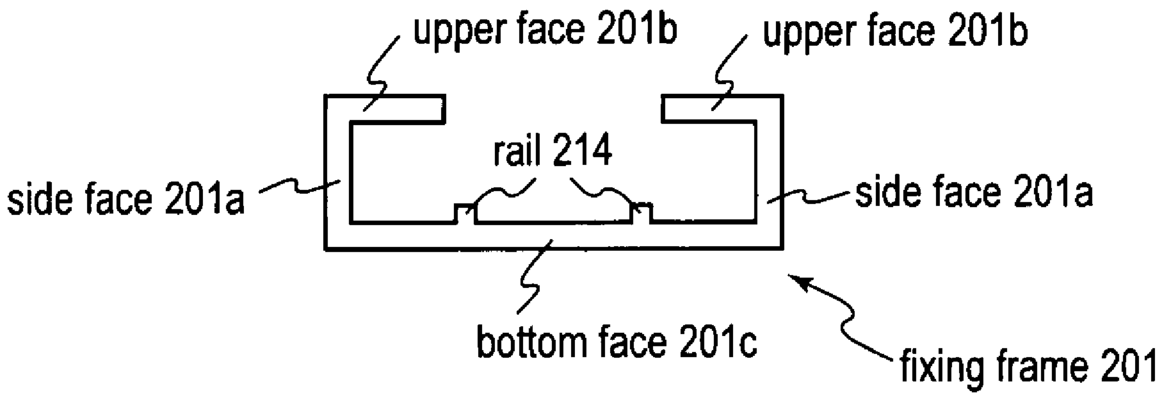
FIGS. 30A to 30C show views illustrating another example of the fixing frame according to this embodiment.
Figure 30B:
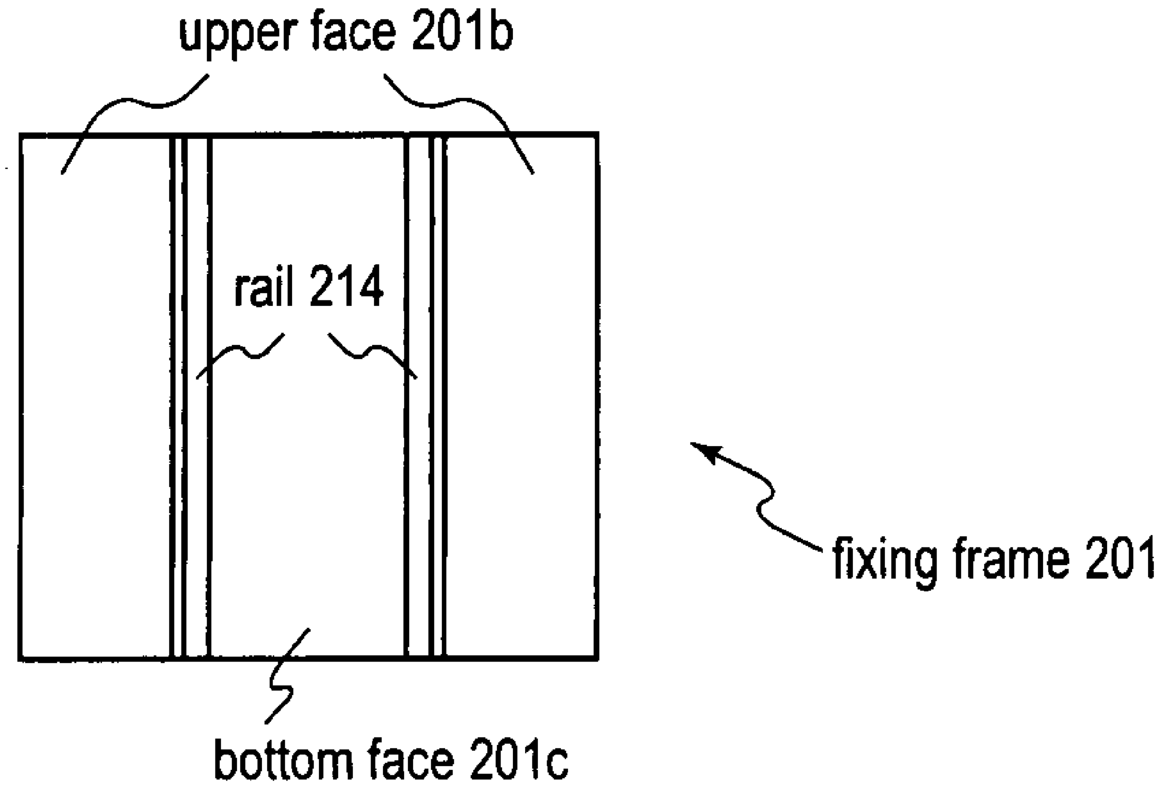
Figure 30C:
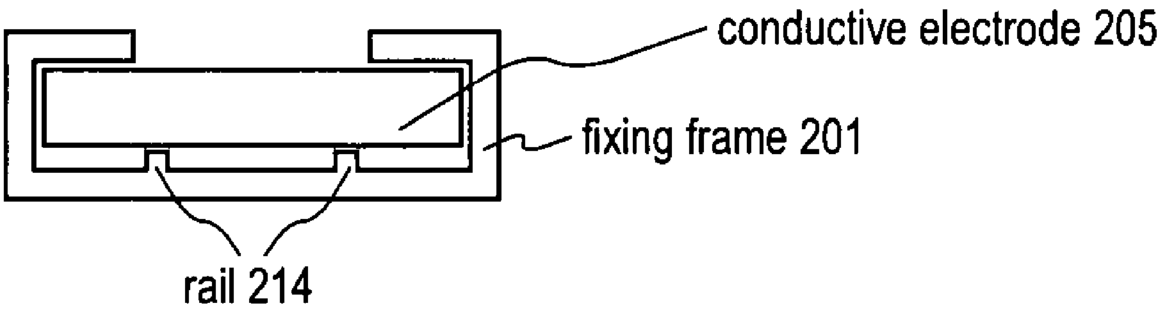
Figure 31A:
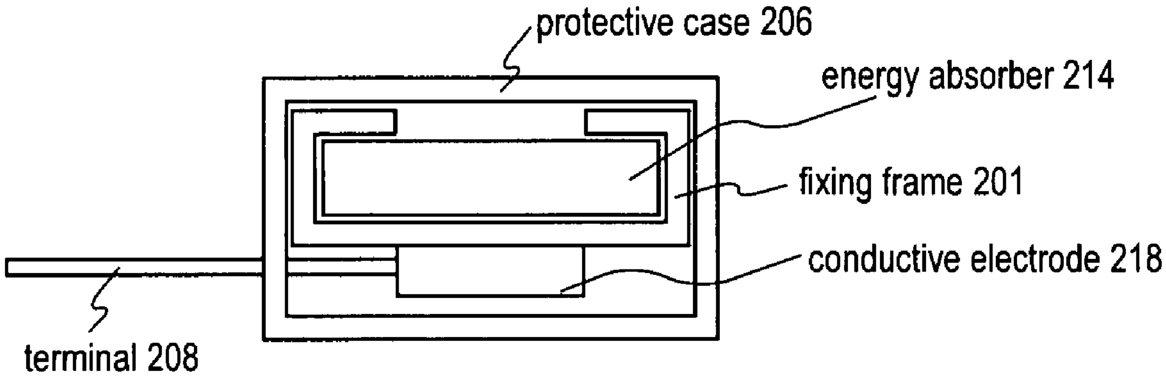
FIGS. 31A and 31B show see-through views illustrating another example of the arrester according to this embodiment.
Figure 31B:
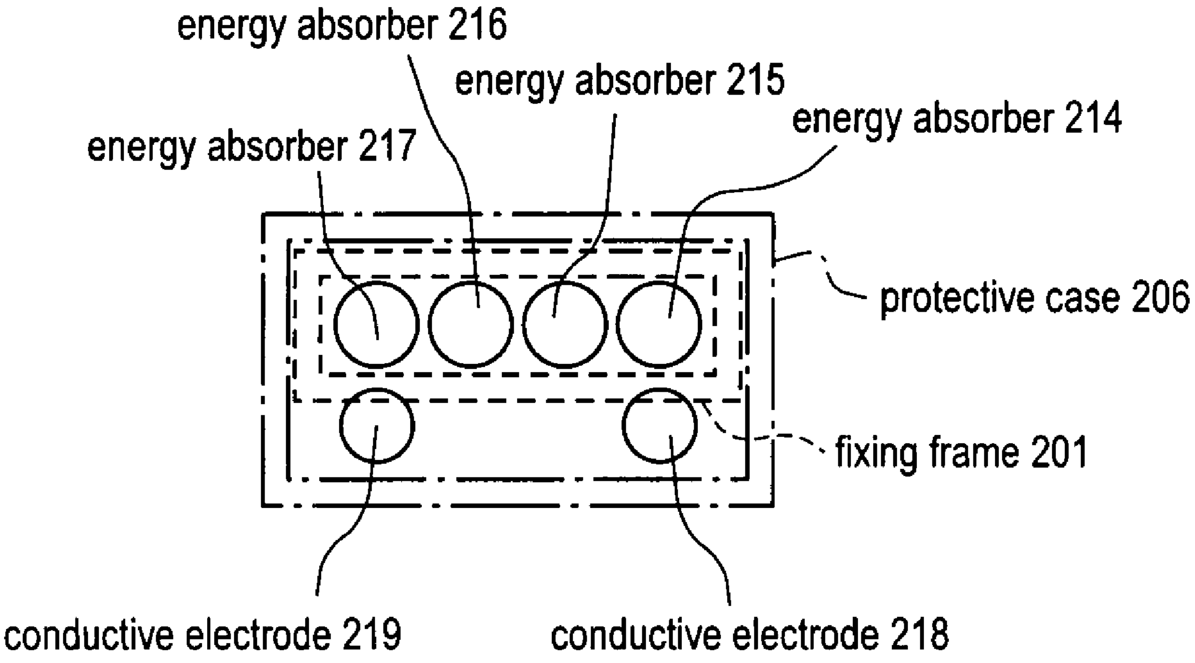
Figure 32:
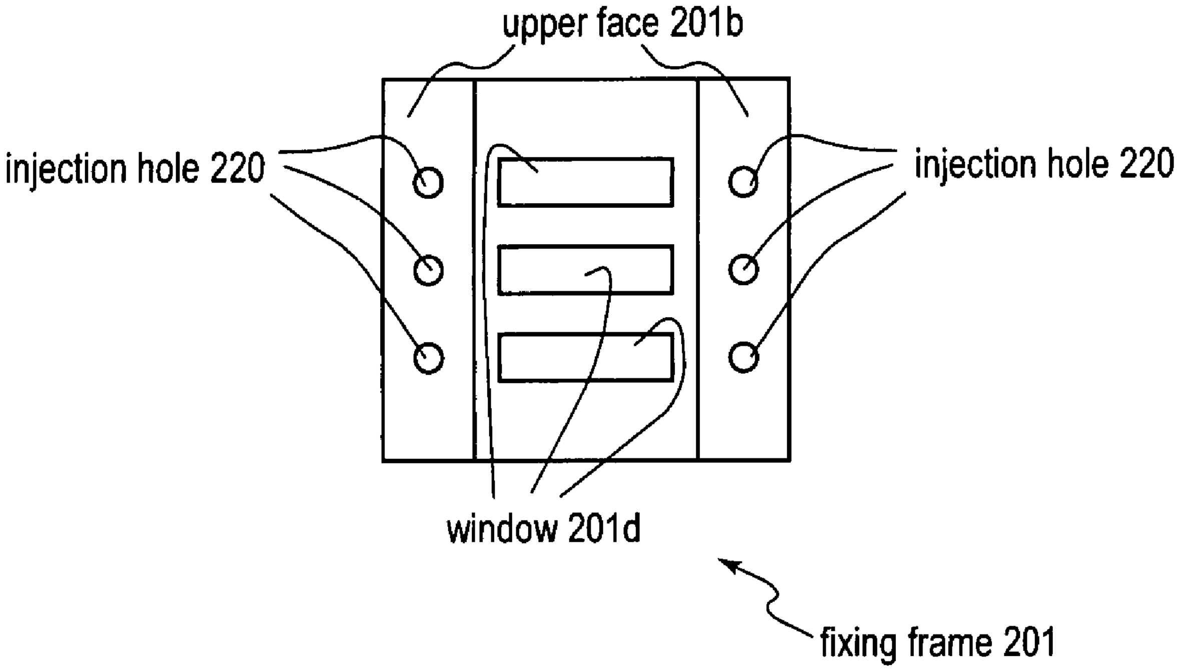
FIG. 32 is a view illustrating another example of the fixing frame according to this embodiment.
Figure 33:
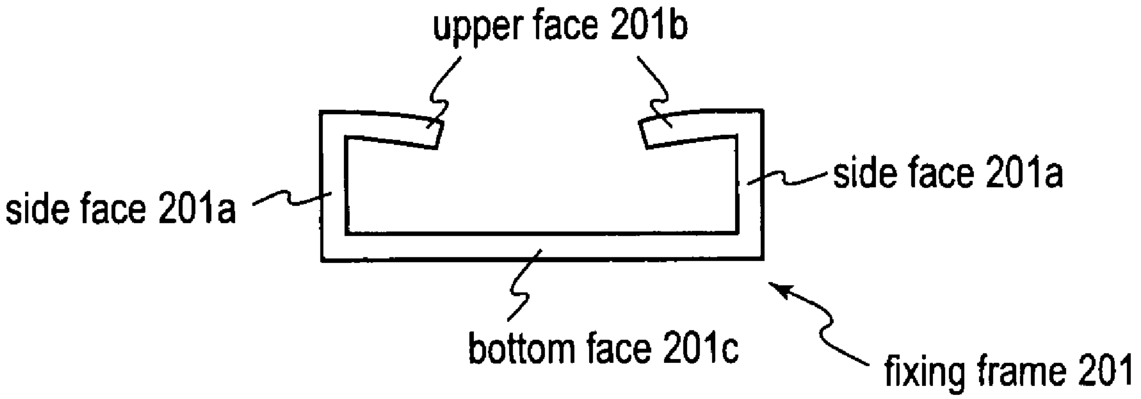
FIG. 33 is a view illustrating another example of the fixing frame according to this embodiment.
Figure 34:
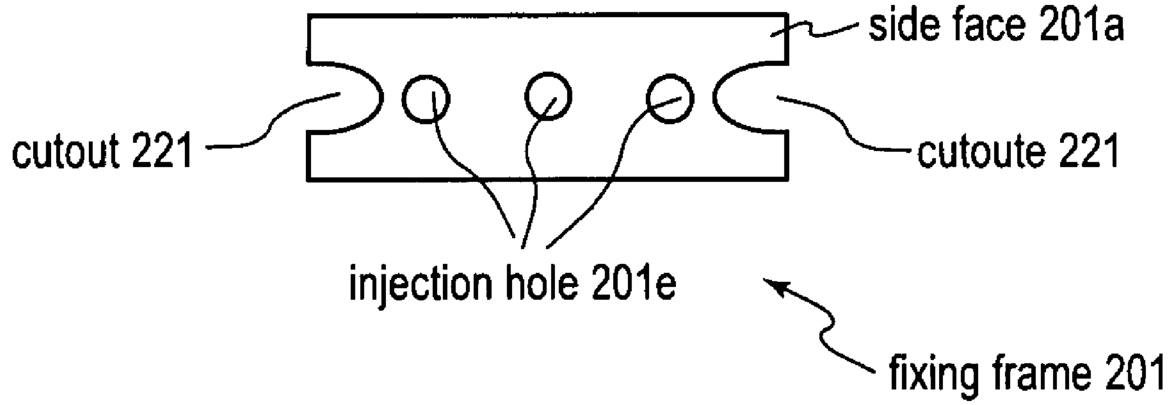
FIG. 34 is a view illustrating another example of the fixing frame according to this embodiment.
Figure 35:
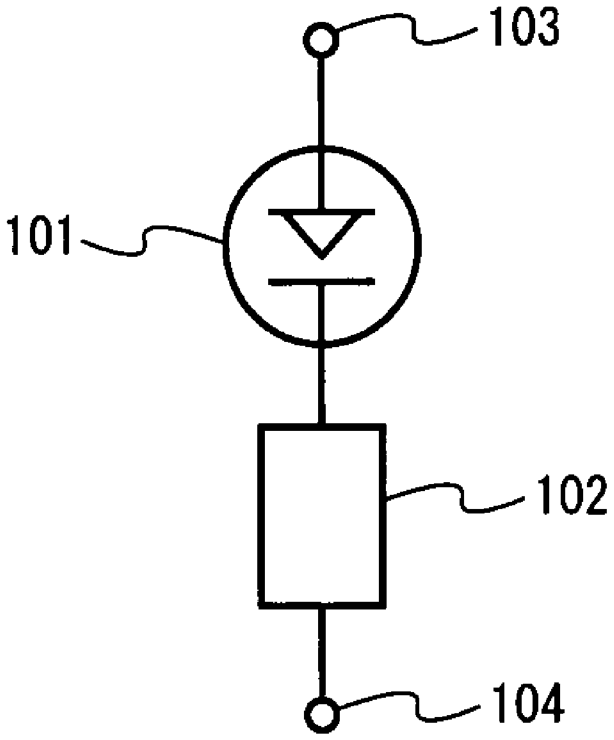
FIG. 35 is a schematic view illustrating the configuration of a conventional arrester.
Figure 36:
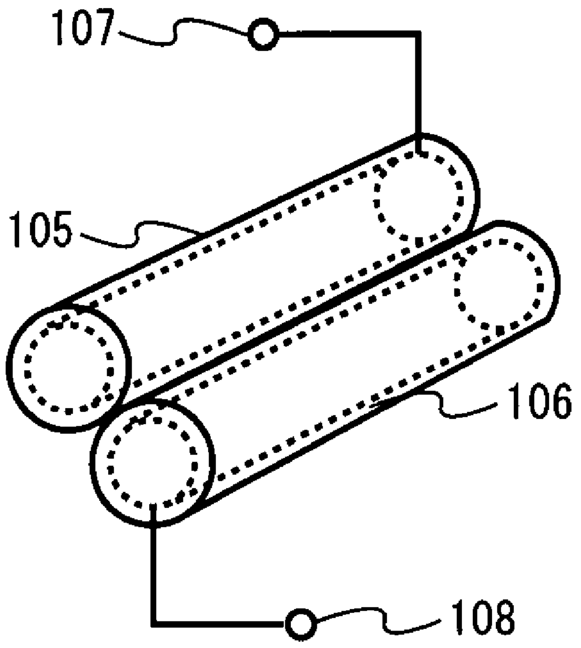
FIG. 36 is a schematic view illustrating the configuration of a conventional arrester.

The invention claimed is:

1. An arrester, comprising:

at least two energy absorbers; and a pair of conductive electrodes, wherein an elastic inorganic adhesive fixes the at least two energy absorbers between the pair of conductive electrodes, so as to define at least two air gaps which are formed in series at equal intervals, and the at least two air gaps include planer gaps.

2. The arrester according to claim 1, further comprising a pair of terminals for connecting to a circuit board, that are respectively connected to the pair of conductive electrodes.

3. The arrester according to claim 1, further including a protective case or frame to which the energy absorbers and the conductive electrodes are fixed with the inorganic adhesive.

4. The arrester according to claim 3, wherein the inorganic adhesive has insulating properties.

5. An arrester, comprising:

at least one energy absorber; and a pair of conductive electrodes, wherein an elastic inorganic adhesive fixes the at least one energy absorber between the pair of conductive electrodes so as to define at least two air gaps which are formed in series at equal intervals, the at least two air gaps include planer gaps, an air gap is formed between one of the pair of conductive electrodes and the energy absorber, and the conductive electrode and the energy absorber that form the air gap are fixed to each other with the elastic inorganic adhesive.

6. The arrester according to claim 5, further comprising a pair of terminals for connecting to a circuit board, that are respectively connected to the pair of conductive electrodes.

7. The arrester according to claim 5, further including a protective case or frame to which the energy absorbers and the conductive electrodes are fixed with the inorganic adhesive.

8. The arrester according to claim 7, wherein the inorganic adhesive has insulating properties.

9. An arrester, comprising:

at least two energy absorbers; and a pair of conductive electrodes, wherein an elastic inorganic adhesive fixes the at least two energy absorbers between the pair of conductive electrodes, so as to define at least two air gaps which are formed in series at equal intervals, the at least two air gaps include planer gaps, and at least one of the pair of conductive electrodes and one of the at least two energy absorbers are in contact with each other among the at least two energy absorbers and the pair of conductive electrodes, those forming the air gaps are fixed to each other with the elastic inorganic adhesive.

10. The arrester according to claims 9, further comprising a pair of terminals for connecting to a circuit board, that are respectively connected to the pair of conductive electrodes.

11. The arrester according to claim 9, further including a protective case or frame to which the energy absorbers and the conductive electrodes are fixed with the inorganic adhesive.

12. The arrester according to claim 11, wherein the inorganic adhesive has insulating properties.

13. An arrester, comprising:

at least one energy absorber;

a pair of conductive electrodes; and a fixing frame for fixing the energy absorber, wherein an elastic inorganic adhesive fixes the at least one energy absorber between the pair of conductive electrodes, so as to define at least two air gaps which are formed in series at equal intervals, the at least two air gaps include planer gaps, and among the at least one energy absorber and the pair of conductive electrodes, those forming the air gaps are fixed to the fixing frame with the elastic inorganic adhesive.

14. The arrester according to claim 13, further comprising a pair of terminals for connecting to a circuit board, that are respectively connected to the pair of conductive electrodes.

15. The arrester according to claim 13, wherein the at least one energy absorbers or the conductive electrodes are fixed to the fixing frame with the elastic inorganic adhesive.

16. The arrester according to claim 15, wherein the inorganic adhesive has insulating properties.

17. An arrester, comprising:

at least two energy absorbers;

a pair of conductive electrodes; and spacers provided between the at least two energy absorbers so that at least two air gaps are formed in series at equal intervals, wherein the at least two air gaps include planer gaps wherein the at least two energy absorbers forming the at least two air gaps and the spacers are fixed to one another with an elastic inorganic adhesive, the inorganic adhesive has insulating properties.

18. An arrester, comprising:

at least one energy absorber;

a pair of conductive electrodes; and spacers provided between the at least one energy absorber and the pair of conductive electrodes so that at least two air gaps are formed in series at equal intervals, wherein the at least one energy absorber forming the at least two air gaps and the spacers are fixed to each other with an elastic inorganic adhesive, the at least two air gaps include planer gaps, an air gap is formed between one of the pair of conductive electrodes and the energy absorber, the conductive electrode and the energy absorber that form the air gap are fixed to one another with the elastic inorganic adhesive, and the inorganic adhesive has insulating properties.

19. An arrester, comprising:

at least two energy absorbers;

a pair of conductive electrodes; and spacers provided between the at least two energy absorbers and the pair of conductive electrodes so that at least two air gaps are formed in series at equal intervals, wherein the at least two air gaps include planer gaps, at least one of the pair of conductive electrodes and one of the at least two energy absorbers are in contact with each other, the at least two energy absorbers and the pair of conductive electrodes which form the air gaps, and the spacers are fixed to one another with an elastic inorganic adhesive, and the inorganic adhesive has insulating properties.

20. An arrester, comprising:

at least one energy absorber;

a pair of conductive electrodes;

a fixing frame for fixing the energy absorber, and spacers provided between the at least one energy absorber and the pair of conductive electrodes so that at least two air gaps are formed in series at equal intervals, the at least two air gaps include planer gaps, the at least one energy absorber and the pair of conductive electrodes which form the air gaps, and spacers are fixed to one another with an elastic inorganic adhesive, and the inorganic adhesive has insulating properties.

* * * * *